United States Patent
Chambers et al.

(10) Patent No.: US 7,573,862 B2
(45) Date of Patent: Aug. 11, 2009

(54) SYSTEM AND METHOD FOR OPTIMIZING NETWORK CAPACITY IN A CELLULAR WIRELESS NETWORK

(76) Inventors: Mahdi Chambers, 14 Langeveld Dr., Freehold, NJ (US) 07728; Desmond Hazell, 14 Johanna Ct., Piscataway, NJ (US) 08854

( * ) Notice: Subject to any disclaimer, the term of this patent is extended or adjusted under 35 U.S.C. 154(b) by 947 days.

(21) Appl. No.: 10/774,181

(22) Filed: Feb. 6, 2004

(65) Prior Publication Data
US 2005/0007993 A1    Jan. 13, 2005

Related U.S. Application Data

(60) Provisional application No. 60/445,388, filed on Feb. 6, 2003.

(51) Int. Cl.
*H04J 3/24* (2006.01)
(52) U.S. Cl. .................. 370/349; 370/342; 370/401; 455/3.01; 455/14; 455/552.1; 714/31
(58) Field of Classification Search .............. 370/342, 370/349, 401; 455/3.01, 14, 552.1; 714/31
See application file for complete search history.

(56) References Cited

U.S. PATENT DOCUMENTS 5,644,622 A    7/1997    Russell (Continued)

FOREIGN PATENT DOCUMENTS

EP    0904639    5/2001

(Continued)

OTHER PUBLICATIONS

Microsoft Computer Dictionary, Microsoft Press, 5th Edition, p. 432, Year 2002.*

*Primary Examiner*—Quynh H Nguyen
(74) *Attorney, Agent, or Firm*—Gottlieb, Rackman & Reisman, P.C.

(57) ABSTRACT

A system and method is disclosed for increasing the efficiency of a cellular communication network, reduce ongoing operating costs and increase revenue. According to one aspect, a method is disclosed for increasing the efficiency of a cellular communication network whereby network capacity in the radio access network (RAN) and baseband processing for wireless connections are dynamically adjusted to automatically provision sufficient bandwidth and baseband processing capacity in response to changes in the network. The method is further extended by implementing policy management which allows wireless carriers to develop and implement network based policies to automatically increase or decrease the amount of processing resources and network bandwidth required from any cell site, hub or mobile switching office. According to another aspect, network efficiency is enhanced by utilizing a novel cellular network infrastructure. RF signals from cell site antennas of various technology types are demodulated, digital bit information is extracted from the RF signals, processed, and groomed into Gigabit Ethernet/Resilient Packet Ring (GigE/RPR) or Ethernet over copper traffic flows using specific Quality of Service (QoS) priorities. The GigE/RPR traffic flows are routed to hub sites or mobile switching offices, at which point the packetized information is extracted and converted to RF signals that are equivalent to the signals that were received at the antenna. The RF signals are sent over coaxial cable to a network hub including a pool of Base Transceiver Stations (BTSs) (or Node Bs). The hub is coupled to one or more mobile switching offices via a second fiber optic ring.

28 Claims, 18 Drawing Sheets

U.S. PATENT DOCUMENTS

| | | | |
|---|---|---|---|
| 5,802,173 A | 9/1998 | Hamilton-Piercy | |
| 5,852,651 A | 12/1998 | Fischer | |
| 5,969,837 A | 10/1999 | Farber | |
| 6,016,311 A | 1/2000 | Gilbert | |
| 6,353,600 B1 | 3/2002 | Schwartz | |
| 6,415,132 B1* | 7/2002 | Sabat, Jr. | 455/3.01 |
| 6,421,335 B1 | 7/2002 | Kilkki | |
| 6,477,154 B1 | 11/2002 | Cheong | |
| 6,504,831 B1* | 1/2003 | Greenwood et al. | 370/342 |
| 6,560,441 B1* | 5/2003 | Sabat et al. | 455/14 |
| 6,894,994 B1* | 5/2005 | Grob et al. | 370/335 |
| 2002/0048071 A1 | 4/2002 | Suzuki | |
| 2002/0080816 A1 | 6/2002 | Spinar | |
| 2002/0186674 A1 | 12/2002 | Mani | |
| 2002/0191565 A1 | 12/2002 | Mani | |
| 2005/0193257 A1* | 9/2005 | Stoler | 714/31 |
| 2006/0068837 A1* | 3/2006 | Malone | 455/552.1 |

FOREIGN PATENT DOCUMENTS

| | | |
|---|---|---|
| JP | 2001177866 | 6/2001 |
| WO | WO 96/29834 | 9/1996 |
| WO | WO 03/001834 | 1/2003 |

\* cited by examiner

SYSTEM AND METHOD FOR OPTIMIZING NETWORK CAPACITY IN A CELLULAR WIRELESS NETWORK

CROSS REFERENCE TO RELATED APPLICATIONS

This is a non-provisional application which claims the priority date of provisional patent application Ser. No. 60/445,388 filed on Feb. 6, 2003.

TECHNICAL FIELD

The present invention relates generally to improvements to cellular wireless communication networks, and more particularly to a novel network infrastructure and method for increasing efficiency in a cellular wireless communication network.

DESCRIPTION OF RELATED ART

Cellular wireless networks are designed to support voice and data services and are generally known to include a "network infrastructure" that facilitates wireless communications with mobile stations operating within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC), which also couples to the public switching network (PTSN), the Internet and/or other MSCs.

Wireless interface standards have been promulgated to standardize wireless communications between the mobile terminals and the base stations of the network infrastructure. Wireless interface standards include, for example, the Advanced Mobile Phone Service (AMPS) standards, the Global System for Mobile telecommunications (GSM) standards, the Code Division Multiple Access (CDMA) standards, the Time Division Multiple Access (TDMA) standards, General Packet Radio Service (GPRS) standards and the ENHANCED DATA rates for Global EVOLUTION (EDGE) standards. Generations of these standards are generally referred to as first generation (1G), second generation (2G), third generation (3G), fourth generation (4G), etc. Each advancing generation of standards typically supports a greater number of services, a greater number of features, and provides better communication qualities. Resultantly, network infrastructures supporting these superior service offerings must provide increased performance levels, both from a network infrastructure perspective and from a wireless link perspective.

FIG. 1 illustrates an exemplary portion of a cellular wireless communication system according to the prior art which includes a mobile station (MS) 102, one or more base transceiver stations (BTSs) (or Node Bs) 104-1, 104-2 and a base station controller (BSC) (or RNC) 106. Elements 102, 104 and 106 collectively comprise a Radio Access Network (RAN). FIG. 1 also includes a mobile switching center (MSC) 108 and one or more GPRS support nodes (GSN) 110. Elements 108 and 110 collectively comprise a Core Network (CN).

The legacy network infrastructure 115 shown includes DS3/DS1/DS0 cross-connect systems (DCS) for routing traffic around the MSO, echo cancellation systems for voice enhancements, channel banks to transport signaling links, Asynchronous Transfer Mode (ATM) concentrators and Internet Protocol (IP) routers for handling data traffic. The legacy infrastructure connects to a Network Operations Center (NOC) 117 that runs network management software to control the network, and also connects to the Public Switched Telephone Network (PSTN) 120 to allow calls to/from the wired network. Call signaling for setting up and tearing down calls is accomplished using Signaling System 7 (SS7) 119.

Modern cellular wireless communication systems, such as the one shown in FIG. 1, use digital technology and associated methods to transfer information between the various network elements. For example, at the mobile station (MS) 102, voice is digitized and compressed and the resulting bit stream is combined with data from applications and digital control information. The combined bit stream is encoded and modulated onto an assigned radio frequency carrier and transmitted over the air to antennas 112 connected to respective base transceiver stations 104. The base transceiver station 104 demodulates the received signals, extracts the bit stream and decodes the digital information. The decoded digital information is then transported over terrestrial facilities (via T1 or E1 lines) to a base station controller 106 for processing. After processing, the base station controller 106 forwards the information associated with voice communications to a mobile switching center 108 for connection to other mobile switches or to the Public Switched Telephone Network (PSTN) 120. Data traffic is sent to the GSN 110. The base station controller 106 manages radio access network (RAN) functions such as roaming and handoffs. The process is reversed for information flowing from the network to the mobile station (MS) 102.

One drawback of prior art communication systems, such as the one shown in FIG. 1, is that as cellular wireless networks migrate to 3rd Generation (3G) systems, it is expected that the number of base transceiver stations will increase dramatically by a factor of two or three. This increases the complexity of the control, management and maintenance of the network.

Another drawback of prior art communication systems is that the underlying network infrastructure is based on T1/E1 and SONET/SDH standards, which are fixed in nature and cannot react to changes in demand due to mobile network conditions.

A further drawback of prior art communication systems, as exemplified in FIG. 1, is that the network cannot intelligently transport antenna traffic to and from the base transceiver station 104 and efficiently aggregate the traffic associated with different technologies at a cell site.

From the disclosure above, the present invention recognizes that there is a need for a high capacity, scalable network infrastructure for use in the radio access network (RAN) with the ability to dynamically adjust capacity, intelligently route and transport traffic between antennas, base transceiver stations, hubs, and mobile switching offices.

SUMMARY OF THE INVENTION

A system and method is disclosed for increasing the efficiency of a cellular communication network, reduce ongoing operating costs and increase revenue.

According to one aspect, a method for increasing the efficiency of a cellular communication network is disclosed whereby network capacity in the RAN and baseband processing for wireless connections are dynamically adjusted to automatically provision sufficient bandwidth and baseband processing capacity in response to changes in the network. The method is referred to by the inventors as Continuous Network Optimization (CNO). The CNO method of network optimization is further extended by implementing policy management which allows wireless carriers to develop and implement network based policies to automatically increase or decrease the amount of processing resources and network bandwidth required from any cell site, hub or mobile switching office.

According to another aspect, network efficiency is enhanced by utilizing a novel cellular network infrastructure. Briefly described, the network infrastructure includes a novel MIC2010™ Remote Radio Unit (RRU) disposed at each cell site. The RRUs are essentially packet transceiver systems which perform, inter alia, low-level RF processing functions normally associated with a base station transceiver. The RRUs are configured to (1) receive RF/IF signals from co-located cell site antennas, (2) demodulate RF/IF signals received from the antennas to extract the bit-stream generated and transmitted from a mobile station, and (3) perform signal conditioning, digital processing and packetization on the demodulated bit stream. The packetized demodulated bit stream (traffic) is sent from each RRU to a hub over a fiber packet ring or high-speed copper pair(s). The hub includes a novel MIC2022™ Traffic Consolidator Unit (TCU) and a pool of conventional base transceiver stations (BTSs) (or Node Bs). The packetized traffic is received at the hub for depacketization and conversion back to an RF signal that is equivalent to the RF signal received at the antenna. Conversion back to an RF signal is a necessary step in order to connect to existing BTSs (or Node Bs). Alternatively, the packetized signal can be sent directly to a next generation BTS (or Node B) that supports a packet interface, eliminating the need to convert back to an RF signal. The RF signal is then fed to a base transceiver station (BTS) for processing. The output of the BTS is assembled for transport to the base station controller over T1 (or E1) facilities. The T1 (or E1) signals are packetized and output over a second fiber-optic packet ring to a base station controller (BSC) located in a mobile switching office (MSO). The MSO includes a TCU which receives the packetized T1 (or E1) signal from the hub via the second fiber packet ring and converts the T1/E1 signal to a channelized circuit-switched T1/E1 signal that connects to a base station controller (BSC) or Radio Network Controller (RNC). The novel network infrastructure advantageously reduces overall operations costs, enables sharing of network resources and increases network-level reliability.

The invention additionally provides, according to a further aspect, an integrated test and performance monitoring module which advantageously simplifies operations, test and performance monitoring.

It will also be recognized that the present techniques may be readily adapted to various existing systems, such as 2G and 3G mobile networks like GSM, CDMA, WiFi, or UMTS, and the like, as well as other communication systems.

BRIEF DESCRIPTION OF THE DRAWINGS

Referring now to the drawings in which like reference numbers represent corresponding parts throughout, where.

DETAILED DESCRIPTION OF THE INVENTION

Figure 1:
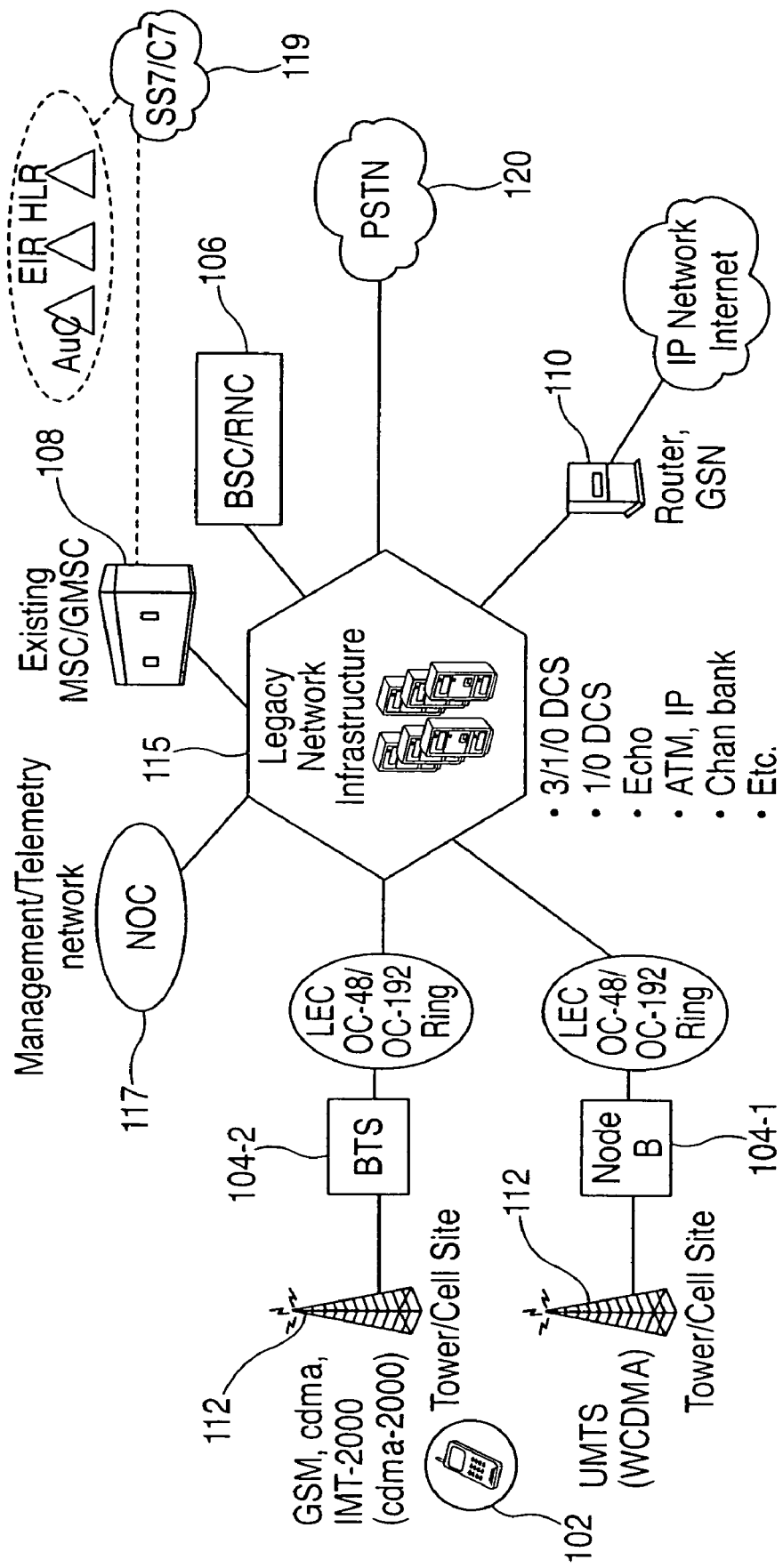
FIG. 1 is a simplified diagram of a wireless communication network in accordance with the prior art.

In accordance with a preferred embodiment of the invention, a communication network provides wireless communication services, such as wireless data communication services, to a plurality of mobile stations operating within the communication network. Stated specifically, in accordance with one aspect, a novel network infrastructure is disclosed for increasing the efficiency of the network. In accordance with another aspect, a continuous network optimization algorithm is disclosed for further enhancing the efficiency of the network in the context of the novel network infrastructure.

The system of the present invention provides many important advantages and efficiencies over prior systems. By utilizing the novel network infrastructure of the invention, overall operations costs are reduced, sharing of radio and network bandwidth resources is enabled and the reliability of the access network is increased. More specific advantages include the substantial elimination of stranded radio capacity, network capacity and baseband processing by automatically adjusting and optimizing network resources responsive to the behavior of the network. A further advantage of the invention is the reduction in backhaul transport costs by 50% or more. Such reduced costs may be realized by supporting alternative backhaul methods over dark fiber or high-speed copper pairs. In addition to a realized cost benefit, by transporting over dark fiber, failures associated with T1 (or E1) facilities are also eliminated. Another advantage of the invention is realized through the incorporation of auto-detection and auto-provisioning capabilities which substantially eliminates the time needed to provide new bandwidth to cell sites, hub and mobile switching offices. A further advantage of the invention is an ability to groom and route traffic based on various indicia, including but not limited to (a) traffic types (i.e., RF signals from various antennas, (b) technology types, and (c) service providers. The groomed (segregated) traffic allows for transportation over packet ring or copper pair using Quality of Service flows. Another advantage of the invention is the support of alternative network architectures, for example, in one embodiment, a multiplicity of base station transceivers are resident at a central location (hub) to facilitate sharing of baseband processing resources to accommodate dynamic changes in network behavior. A still further advantage of the invention is the reduction in the number of cell sites and base station transceivers for a given area. This is achieved through a combination of using smart antennas at the various cell sites in communication with centralized base station transceivers under control of the continuous network optimization (CNO) process. Yet another advantage of the invention is the reduction in cell site and mobile switching office complexity. Specifically, a remote radio unit (RRU), disposed at a remote cell site, streamlines cell site architecture by reducing the number of individual components.

Further, a traffic consolidator unit (TCU) streamlines the mobile switching office by consolidating legacy functionality. This is accomplished by incorporating DS3/DS1/DS0/Subrate cross-connect functions into the TCU architecture. Another advantage of the invention is a reduction in the frequency of network failures experienced on T1 facilities, which improves service quality. This is achieved by incorporating a capability to dynamically adjust the bandwidth and baseband processing allocated to cell sites and compensate for changes in the mobile network. A still further advantage, is that by implementing auto-detection and auto-provisioning, operations costs are reduced and service introduction intervals are significantly reduced.

In an operation according to the present invention, RF signals from cell site antennas of various technology types (e.g. UMTS (WCDMA), cdma2000, GSM, GPRS, EDGE, 802.11x, public safety, etc.) are demodulated, digital bit information is extracted from the RF signals, processed, and groomed into Gigabit Ethernet/Resilient Packet Ring (GigE/RPR) or Ethernet over copper traffic flows using specific Quality of Service (QoS) priorities. The GigE/RPR traffic flows are routed to hub sites or mobile switching offices, at which point the packetized information is extracted and converted to RF signals that are equivalent to the signals that were received at the antenna. The RF signals are sent over coaxial cable to a pool of Base Transceiver Stations (BTSs) (or Node Bs).

In the reverse direction, RF signals containing a digital bit stream are sent over the coaxial cable from the base station transceiver (BTS) in a hub. The RF signals are demodulated and the bit stream extracted, packetized and groomed into GigE/RPR traffic flows. The GigE/RPR flows terminate at the cell sites where the bit steam is reassembled from the packets, converted to RF signals and sent to the antenna for broadcast to the mobile stations.

In one embodiment, the BTSs (or Node Bs) are next generation BTSs and are configured to directly receive the packetized GigE/RPR traffic flows thereby eliminating the complex and costly RF subsystems in the BTS (or Node B).

Figure 2:
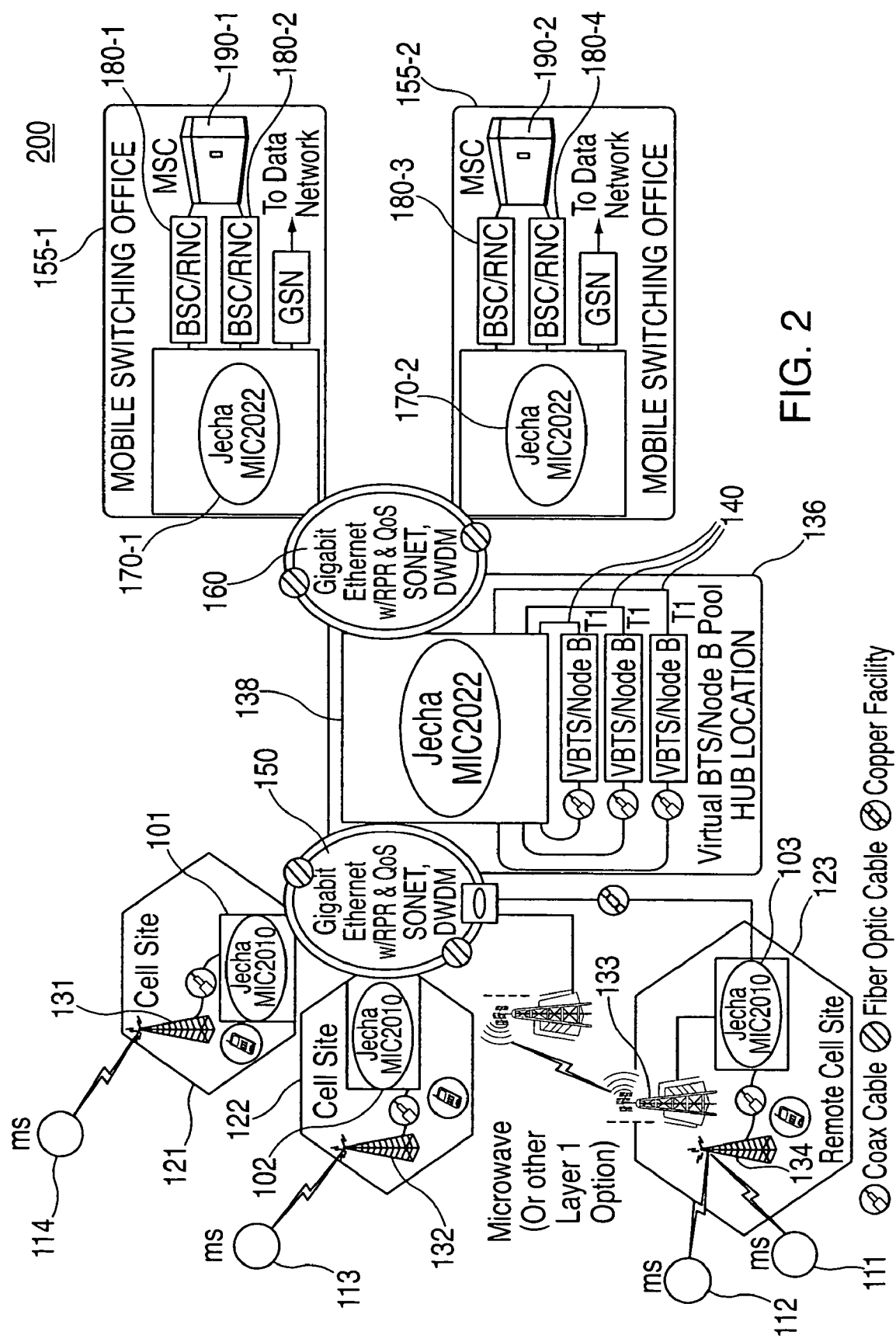
FIG. 2 is a simplified diagram of a wireless communication network in accordance with one embodiment of the invention.

FIG. 2 is a wireless communication network 200 in accordance with an exemplary embodiment of the present invention. Referring to FIG. 2, the exemplary wireless communication network includes, by way of example, three cell sites 121-123, each cell site including a corresponding MIC2010™ Remote Radio Unit, RRU 101, RRU 102, and RRU 103. Each cell site further includes one or more cell site antennas 131-134. The network 200 of FIG. 2 further includes a hub 136 including an MIC2022™ Traffic Consolidator Unit (TCU) 138 and a pool of base transceiver stations (BTSs) 140, three of which are shown. The hub 136 is coupled to the cell sites 121-123 via a first fiber optic ring 150 which is preferably implemented as a Gigabit Ethernet/Resilient Packet Ring (GigE/RPR) or Ethernet over copper traffic flows. To facilitate backward compatibility, the fiber optic ring may also be implemented as a SONET/SDH ring. The hub 136 is coupled to one or more mobile switching offices 155-1, 155-2 via a second fiber optic ring 160. It is noted that the exemplary network of FIG. 2 is shown for simplicity. A typical network may include more or fewer elements than illustrated in FIG. 2.

As stated above, communication network 200 is bi-directional. That is, in a reverse direction, traffic flows coming from the Traffic Consolidator Unit 138 into the Remote Radio Units (RRUs) 101-103 from the packet ring 150 are analyzed to determine if the traffic should terminate on a first Remote Radio Unit or be allowed to pass through to the next Remote Radio Unit on the ring. If the traffic is destined for the current Remote Radio Unit, packets are fed into an RRU QoS/RPR processing function that is a software subprocess that runs on the Applications Processor. The QoS/RPR process determines the destination and associated priority of the packet traffic in order to terminate or pass through to the next node. This is part of the RPR protocol capability and is preferably implemented as a software process that runs on the Applications Processor.

It is further noted that communication system 200 can be a multi-frequency, multi technology wireless access network providing cellular, PCS and wireless data coverage via a distributed fiber access system. Communication system 200 can accommodate current wireless technologies such as TDMA, CDMA, GSM, as well as next generation 3G wireless protocols such as GPRS, 1XRTT, EDGE, 3XRTT, and W-CDMA. 802.11x is also supported.

Remote Radio Units RRU 101 through RRU 103 are capable of communicating with a plurality of mobile stations (MS) 111-114 via the cell site antennas 131-134. The air interface standard can conform to any suitable standard or protocol, and may enable both voice and data traffic, such as data traffic enabling Internet access and web page downloads.

Mobile stations 111-114 may be any suitable wireless communication devices, including conventional cellular telephones, PCS handset devices, portable computers, telemetry devices, and the like, which are capable of communicating with the remote radio units via the cell site antennas. Other types of access terminals, including fixed access terminals, also may be present in wireless network 100. However, for the sake of simplicity, only mobile stations are shown.

Figure 3:
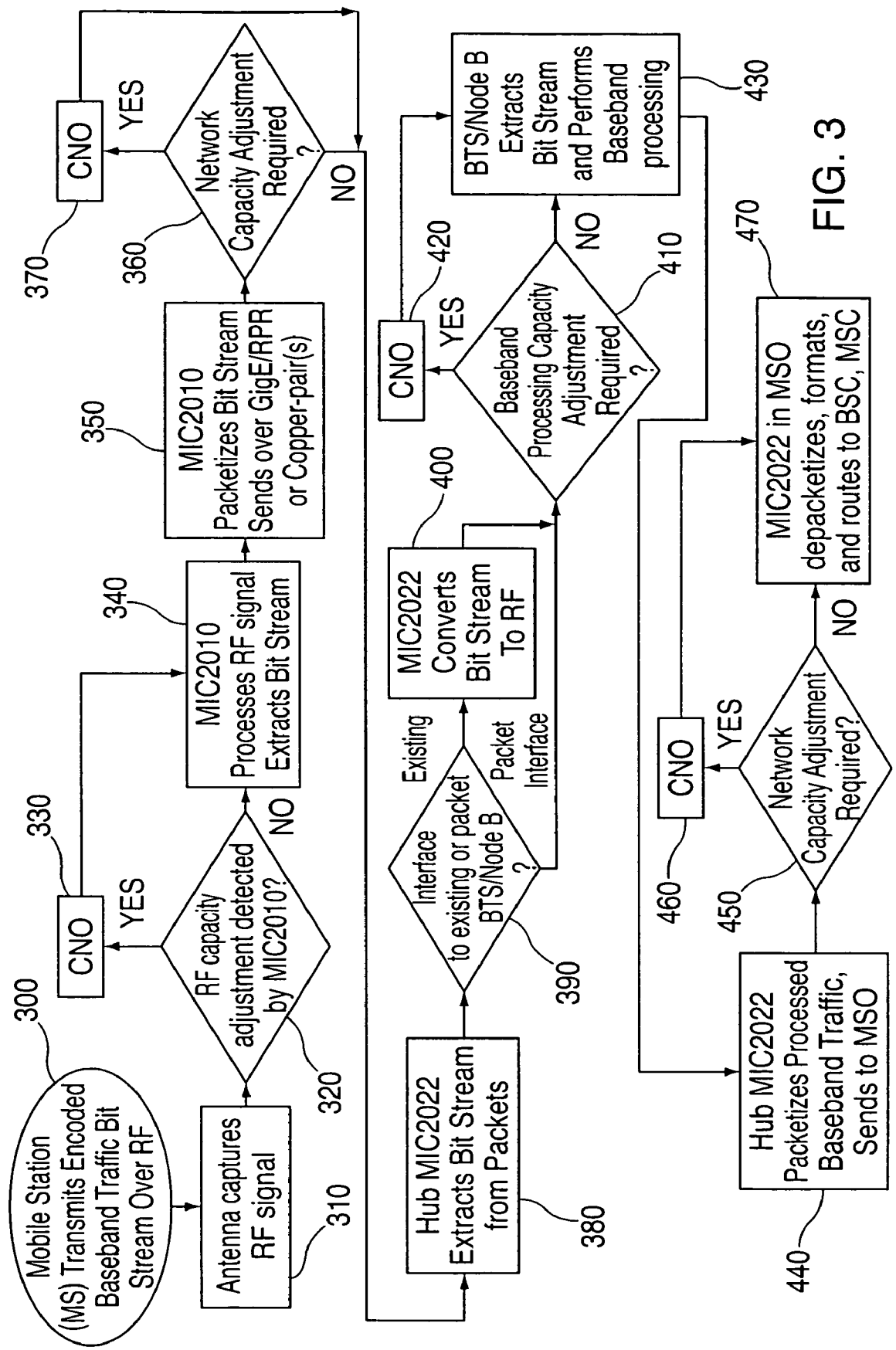
FIG. 3 is a flowchart in accordance with a method of the invention.

Reference is now made to FIG. 3, which shows a flowchart diagram of a method for transporting digital bit streams extracted from radio frequency (RF) signals between antennas and processing elements in a wireless communications network.

At act 300, a mobile station (MS), e.g., MS 111, transmits an RF modulated encoded baseband traffic bit stream to a cell site antenna At act 310, the cell site antenna captures the RF signal.

At act 320, it is determined whether the RF network capacity requires adjustment. If true, the process continues at act 330, otherwise the process continues at act 340. To make such a determination, the RRU connects to the RF Front End/Smart Antenna with an RF interface (coax cable) and a control link (e.g. RS-232 or other standard interface). The status of the RF domain is obtained from the control link and is used as input for the CNO parameters. The RF status obtained from the control link will provide status indicators of low (less than 40% usage), average (~50% usage), or high (at capacity, more RF channels required) for RF activity.

At act 330, the CNO adjusts the RF network capacity. The CNO detects if a change in RF capacity has been made by the smart antenna.

At act 340, the RRU, e.g. RRU 101 processes the RF modulated signal to extract the encoded baseband traffic bit stream.

At act 350, the RRU 101 packetizes the encoded baseband traffic bit stream for transmission over a fiber packet ring.

At act 360, it is determined whether the network capacity, as distinguished from the RF network capacity at act 320, requires adjustment. (Note: the RRU does adjust "network-side" capacity by increasing or decreasing the required bandwidth for transport to the hub). If true, the process continues at act 370, otherwise the process continues at act 380. The determination is made by utilizing the RF capacity indications of low, average, or high from act 320. The previously obtained RF capacity indications translate into specific bandwidth increments that can be programmed (adjusted) by the customer, or invoked automatically using preset policies.

At act 370, the continuous network optimization (CNO) application adjusts the network capacity.

At act 380, the TCU 138 extracts the encoded baseband traffic bit stream from the packets.

At act 390, it is determined whether an existing BTS (or Node B) 140 in the hub requires an RF interface or if a next generation BTS/Node B is used that accepts a packet interface. In other words, it must be determined whether the BTS is a legacy system that requires an RF interface or if it is a next generation version that can accept a packet interface. This can be determined when the TCU 138 is installed in a hub and it is connected to the BTSs.

At act 400, the TCU 138 converts the encoded baseband traffic bit stream to an RF signal.

At act 410, it is determined whether an adjustment is required for the baseband processing capacity. If true, the process continues at act 420, otherwise the process continues at act 430.

At act 420, the continuous network optimization module adjusts the baseband processing capacity.

At act 430, the BTS, extracts the encoded baseband traffic bit stream to perform baseband processing.

At act 440, the TCU 138 in the hub packetizes the processed baseband traffic bit stream for transmission to the MSO 155.

At act 450, it is determined whether the network capacity requires adjustment. If true, the process continues at act 460, otherwise the process continues at act 470.

At act 460, the continuous network optimization module adjusts the network capacity.

At act 470, the TCU, e.g., TCU 170-1 in the MSO 155-1 depacketizes, formats and routes the traffic bit stream to the BSC, e.g., BSC 180-1 and MSC, e.g, MSC 190-1.

Table I below illustrates a comparison of bit rates for existing cell sites and bit rates in accordance with the invention. The invention supports interface flexibility by supporting 100 Mbps over a single copper pair as well as up to 1 Gbps over fiber to cell sites. These alternatives are less expensive from an operation expense perspective than current methods. In addition, the invention supports wireless specific interfaces such as GSM Abis and UMTS Iub. The advantage of this approach is that significantly more bandwidth can be supported to cell sites in comparison to what is available today. Support for GSM and UMTS interfaces enables intelligent grooming of traffic by being able to recognize active and idle channels.

TABLE I

|  | Existing Network Bit Rate | OPEX per month | Invention Bit Rates | OPEX per Month |
| --- | --- | --- | --- | --- |
| Cellsite to Hub or MSO | (T1) 1.5 Mbps × N (N = 2 to 6) | $300 to $1000 per T1 | Up to 100 Mbps | $50 to $100 per copper pair |
| Cellsite to Hub or MSO | (DS3/T3) 45 Mbps | $3500 to $5,000 per DS3 | Up to 1 Gbps | Dark Fiber: No monthly OPEX Upfront cost Paid as CAPEX |

Figure 4:
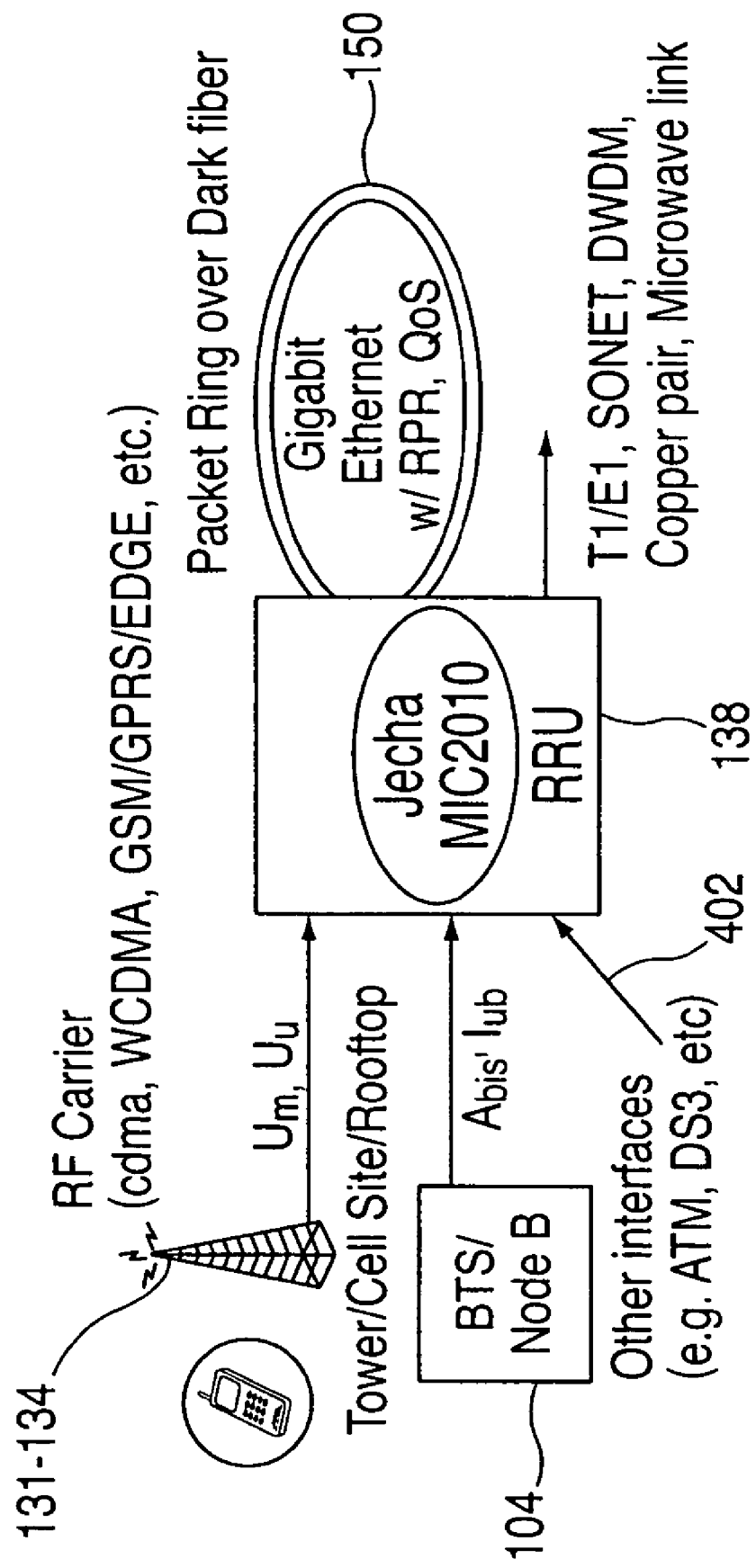
FIG. 4 is an illustration of the various input/output interfaces provided by the RRU.

FIG. 4 is an illustration of the various input/output interfaces supported by the MIC2010™ Remote Radio Unit (RRU) 101-103. The RRU 101-103 interfaces to the antenna (e.g., Tower/Cell Site/Rooftop) 131-134. In the case where a customer decides to co-locate a BTS (or node B) 104 at a radio access network cell site, the BTS (or Node B) is capable of interfacing to the RRU 101-103 via GSM Abis, UMTS Iub or traditional T1/E1. The RRU interfaces to the hub over Gigabit Ethernet/Resilient Packet Ring (GigE/RPR) or Ethernet over copper traffic flows. The RRU 101-103 will also support a host of legacy interfaces 402 such as T1/E1, SONET/SDH, Dense Wavelength Division Multiplexing (DWDM), and Asynchronous Transfer Mode (ATM).

MIC2010-Remote Radio Unit (RRU)

Figure 5:
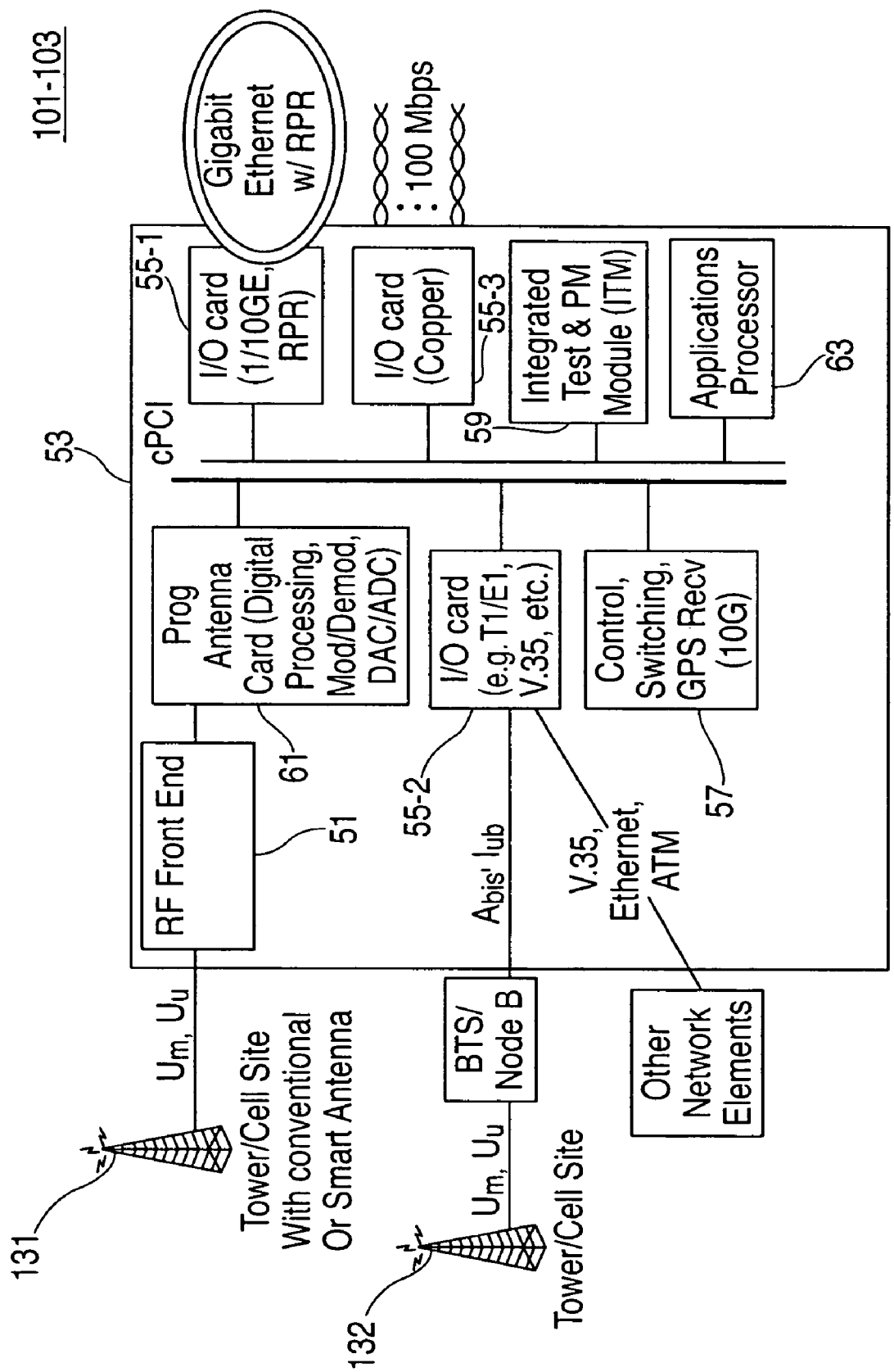
FIG. 5 illustrates an exemplary configuration of the RRU of FIG. 4.

FIG. 5 illustrates an exemplary configuration of the MIC2010™ Remote Radio Unit (RRU) 101-103 of FIG. 2 in an implementation consistent with the present invention. The RRU 101-103 of FIG. 2 includes an RF front end 51, a high speed backplane 53, a plurality of I/O Cards 55-1, 55-2, 55-3, a Control, Switching, GPS Receiver card 57, an integrated Test & PM Module 59, a program antenna card 61 and an application processor 63. The high speed backplane 53 may include one or more conventional buses that permit communication among the components of the customer node 110.

A. RF Front End

Figure 6:
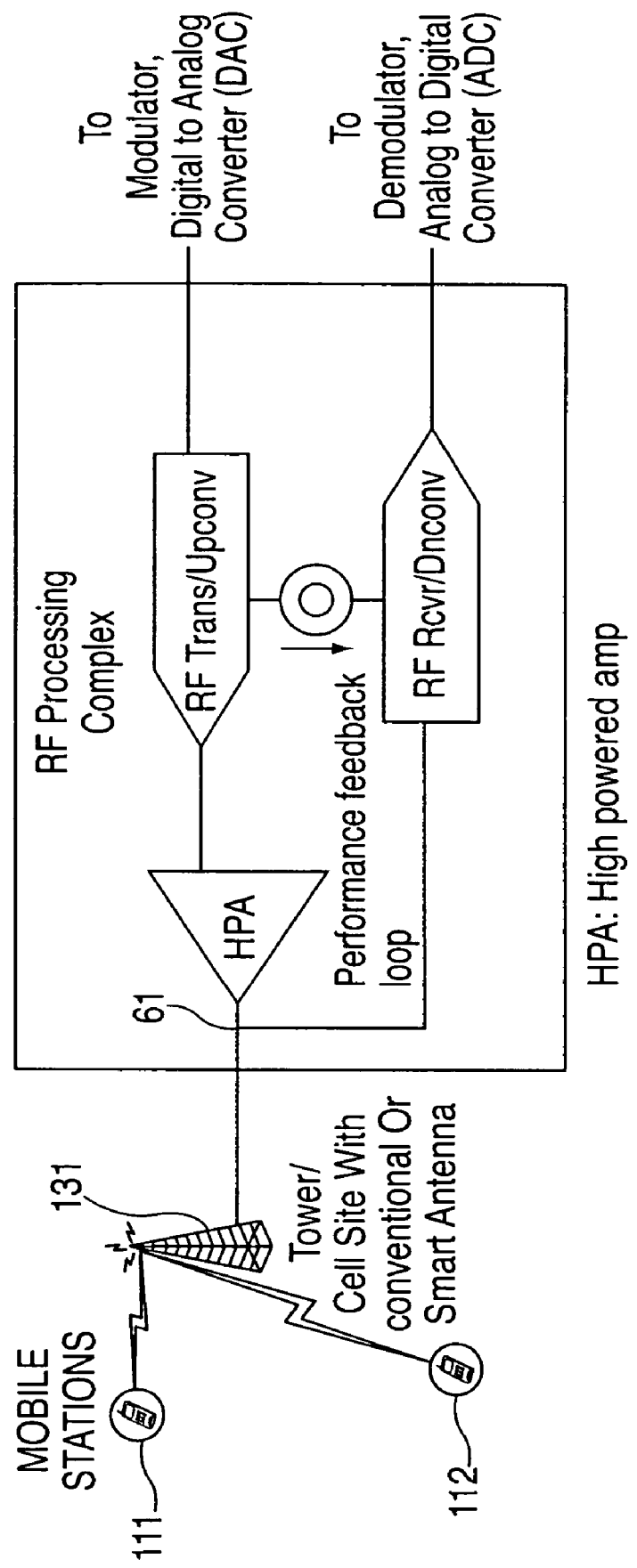
FIG. 6 is a more detailed illustration of the RF front end of FIG. 5.

FIG. 6 is a more detailed illustration of the RF front end 51 of FIG. 5. As shown in FIG. 6, an RF signal is received at input port 61. The received signal is down-converted, and forwarded to the analog-to-digital converter (ADC) (not shown). The RF Front end 51 has capabilities for performing well-known digital processing functions such as for example, waveshaping, crest factor reduction, carrier combining, predistortion, and transmitter linearization in the digital domain. The digital processing functions allows a single-stage up-conversion chain using a low-cost high-powered amplifier (HPA). The HPA can be a simple Class AB instead of more expensive feed forward amplifiers. This dramatically increases power efficiency. The high-powered amp (HPA) drives the transmit signal. The output of the ADC is sent to the digital demodulator. It is also possible to use analog demodulation techniques.

B. Programmable Antenna Card (PAC)

Figure 7:
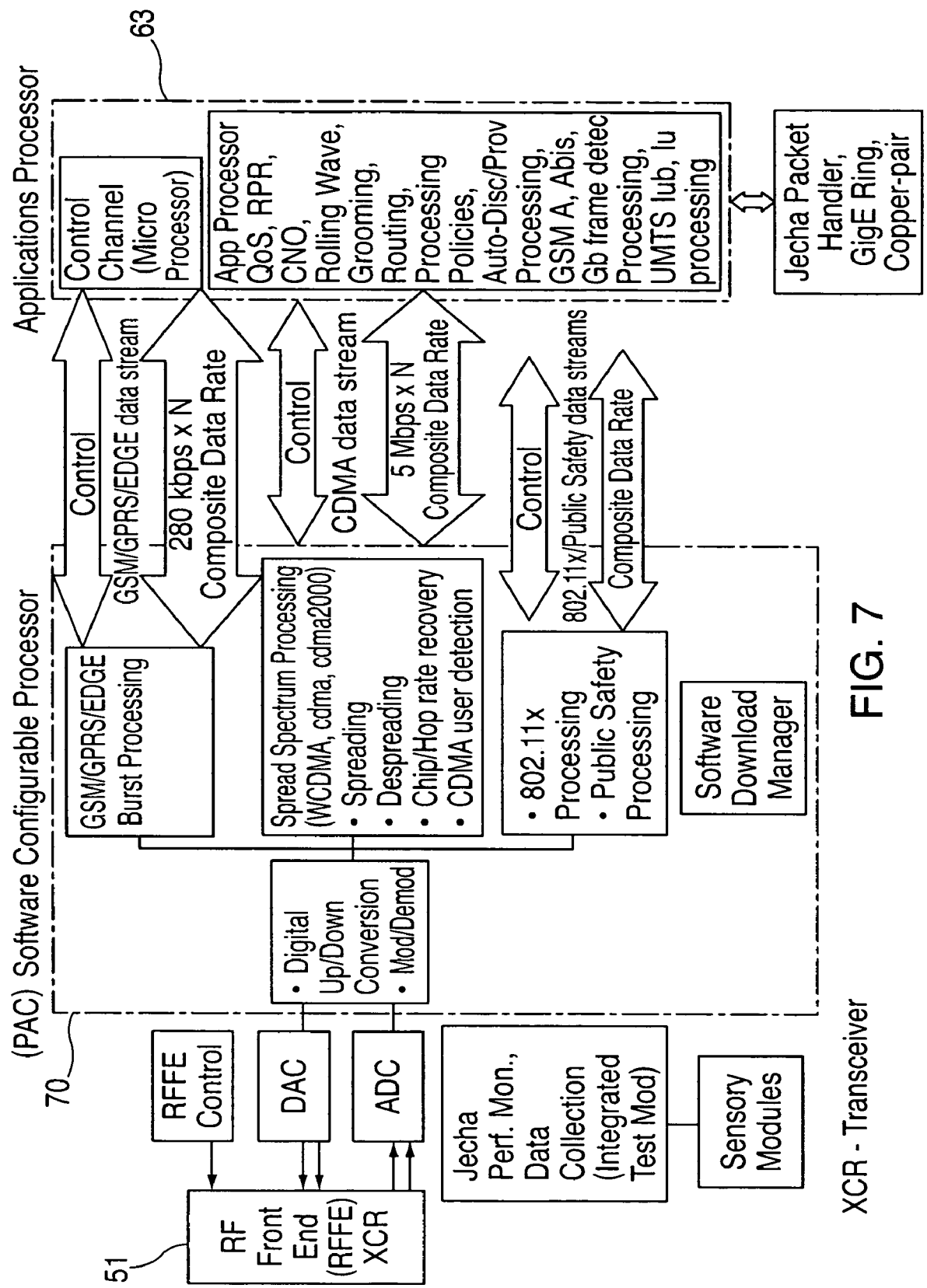
FIG. 7 is a functional diagram of the Programmable Antenna Card (PAC)

FIG. 7 is a functional diagram of the Programmable Antenna Card (PAC) 70, preferably embodied as a software configurable processing engine. The PAC 70 interfaces with an application processor 63, the RF Front End 51 and Smart Antenna control complex (not shown) and supports Analog-to-digital/Digital-to-analog (A/D & D/A) functions, up/down conversion, modulation/demodulation, and specific processing for GSM/GPRS/EDGE, Spread Spectrum, 802.11x, public safety, or other air interfaces. The PAC 70 extracts the composite data rate signal and control for each air interface. This information is mapped into QoS Flows. The composite data rate is derived from demodulating and performing preliminary processing on the RF signal to get down to the actual data rate. Each RF carrier can be demodulated down to a level where traffic channels (user data) and control channels can be accessed.

The PAC 70 works in conjunction with the Applications Processor 63, which supports further features of the RRU 101-103 and TCU 138 invention to be described, including, for example, Continuous Network Optimization, Rolling Wave policy management, grooming and routing.

The PAC 70 despreads and separates the control channel and data traffic channels (not shown) thereby allowing the RRU 138 to optionally perform channel processing on the control channel. Processing the control channel information allows the RRU 138 to gain access to the International Mobile Subscriber Identity (IMSI), the Mobile Subscriber ISDN number (MSISDN), and Packet Data Protocol (PDP) context address (mobile subscriber IP address). This information can be used for special network applications such as Straight Talk Service and Priority Access routing, to be described below.

C. I/O Card (T1/E1, V.35, etc.)

The T1/E1, V.35 I/O card 55-2 will support a variety of traditional interfaces such as standard T1 signals (1.544 Mbps), E1 signals (2.048 Mbps), or V.35 (64 kbps or higher). This card is required for back compatibility with the current wireless infrastructure.

D. I/O Card (Copper Pair)

The copper pair card can support bit rates of 1 Mbps up to 100 Mbps, in increments of 1 Mbps. The copper pair line card can support an inverse multiplexing function, enabling multiple ports to be bonded and appear as one logical channel of a higher bit rate. For example, if four ports are configured for 25 Mbps each, they can be logically combined to create a 100 Mbps channel.

E. Control, Switching GPS Receiver

The control and switching module 57 is used to control all activity within the RRU 138 and provide a 10 Gigabit per second non-blocking switching fabric.

F. Integrated Test & PM Module (ITM)

The Integrated Test and Performance module 59 collects key network performance data and facilitates the installation and troubleshooting of the network. Specifically, the Integrated Test & PM Module is used to facilitate near/far-end testing, setup, installation, and troubleshooting. This module collects network performance data that can be sent to the hub 136 or mobile switching office 155 for further processing and analysis. The network performance data is analyzed to improve network planning.

G. Gigabit Ethernet Card

The gigabit Ethernet card 55-1 grooms the data traffic channels and control channels into GigE/RPR traffic flows according to the bandwidth required for the respective channels. The RRU 138 can groom various RF signals into distinct traffic flows and implement QoS. The resulting traffic flow is mapped onto the packet ring and sent to the hub location, where it is extracted from the ring by the Gigabit Ethernet line card on a MIC2022.

H. Applications Processor (AP)

The Applications Processor 63 supports key functions such as QoS, RPR, grooming and routing policies, Continuous Network Optimization, Rolling Wave Policy Management, GSM and UMTS frame processing.

As briefly described above, the RRU 101-103 interfaces with existing cell site antennas 131-134. The antennas may be traditional antennas and/or smart antenna systems (SAS). As is well known in the art, the Smart Antenna Systems consist of a phased antenna array built from a number of radiating elements. The output from each element is weighted by a complex coefficient (amplitude and phase) and then summed. The beam can be electronically steered by changing the coefficients.

The RRU is configured to operate with the SAS by reacting to demands for increased/decreased RF capacity in real-time. The RRU is capable of increasing or decreasing network bandwidth based on prevailing network conditions.

MIC2022 Traffic Consolidator Unit (TCU)

Figure 8:
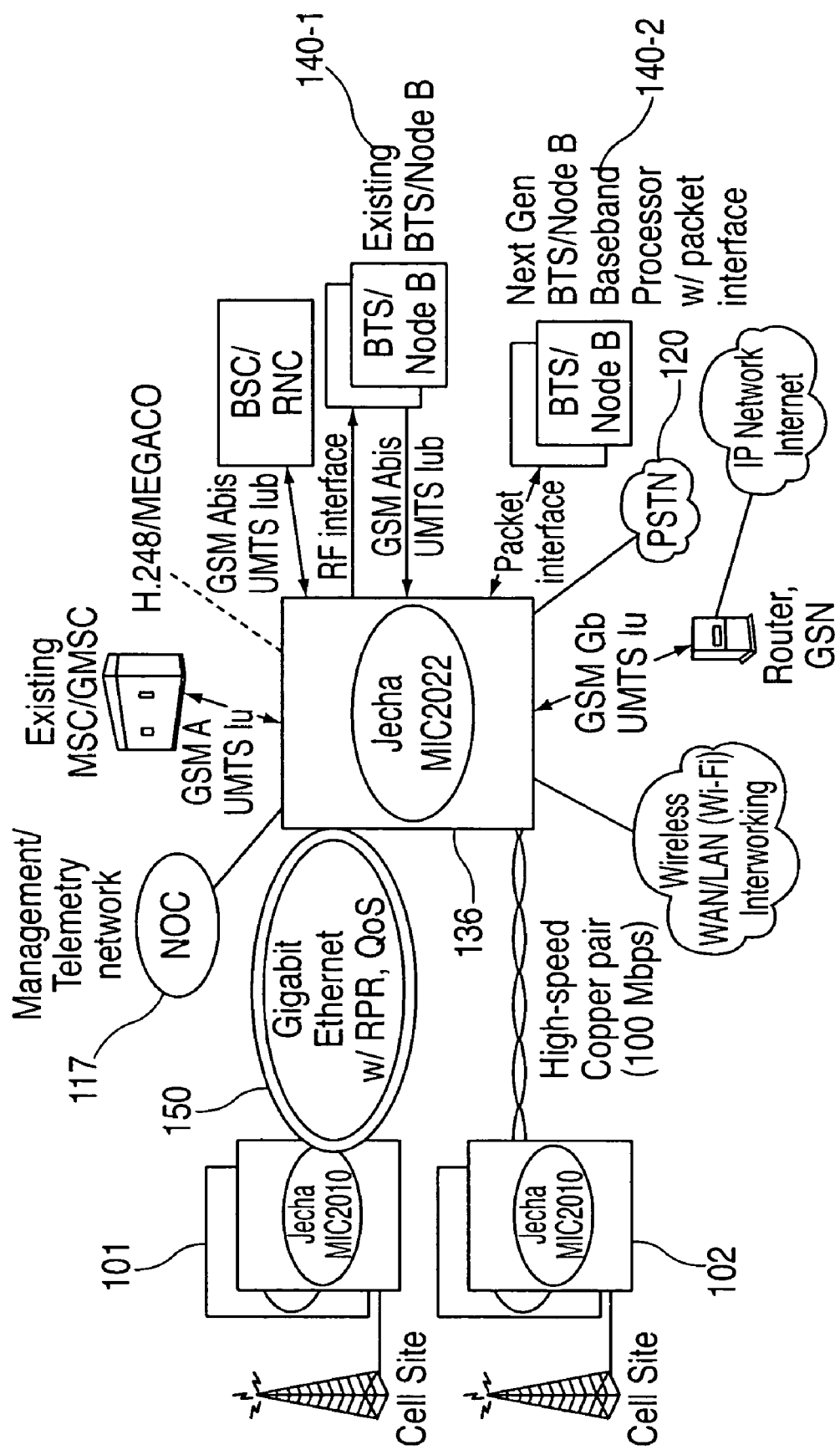
FIG. 8 is the Millennium Infrastructure Consolidator 2022 (MIC2022) that is installed at the hub site and mobile switching office.
Figure 9:
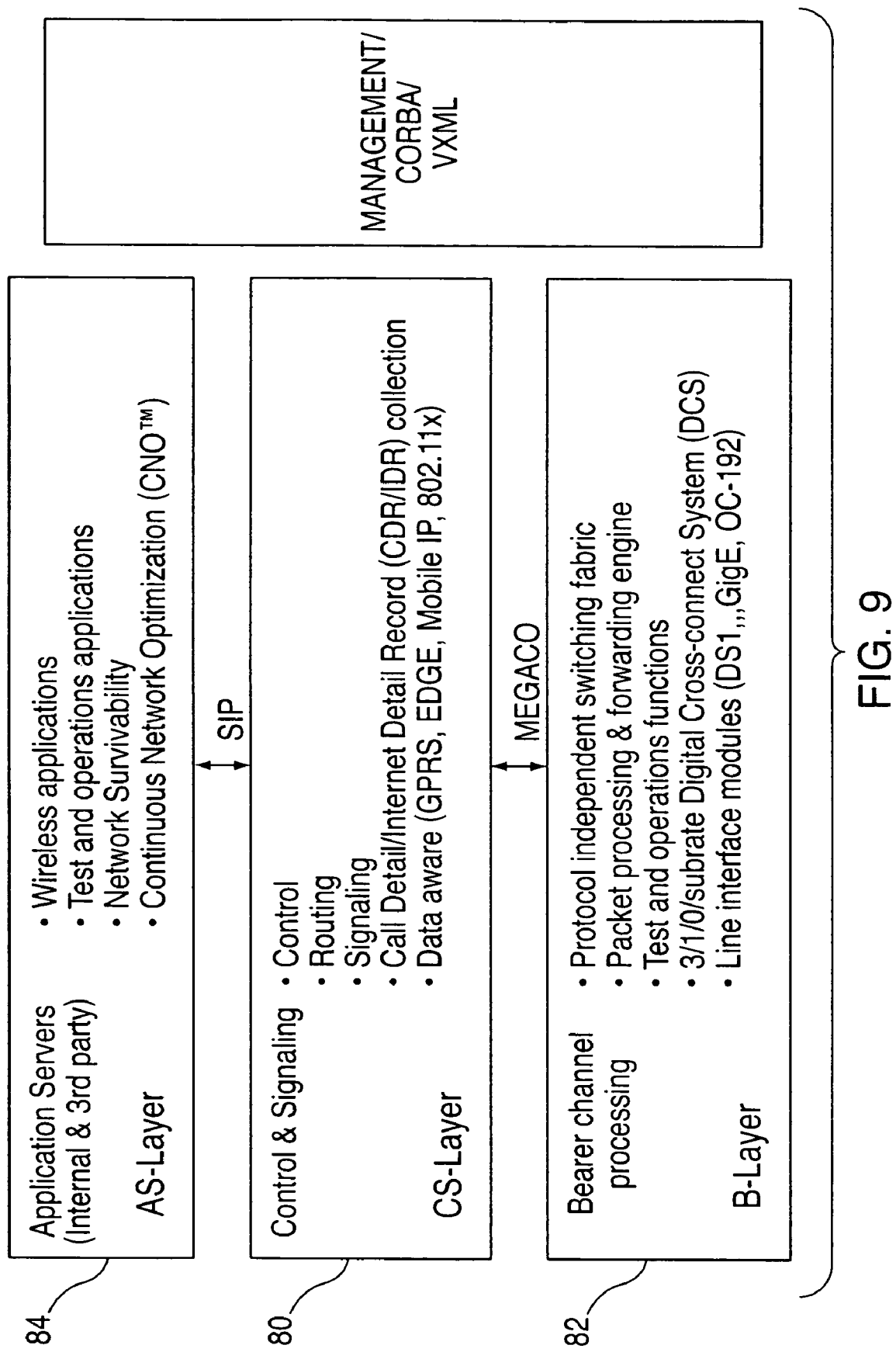
FIG. 9 illustrates the three-layered architecture of the TCU, according to an embodiment of the invention.
Figure 10:
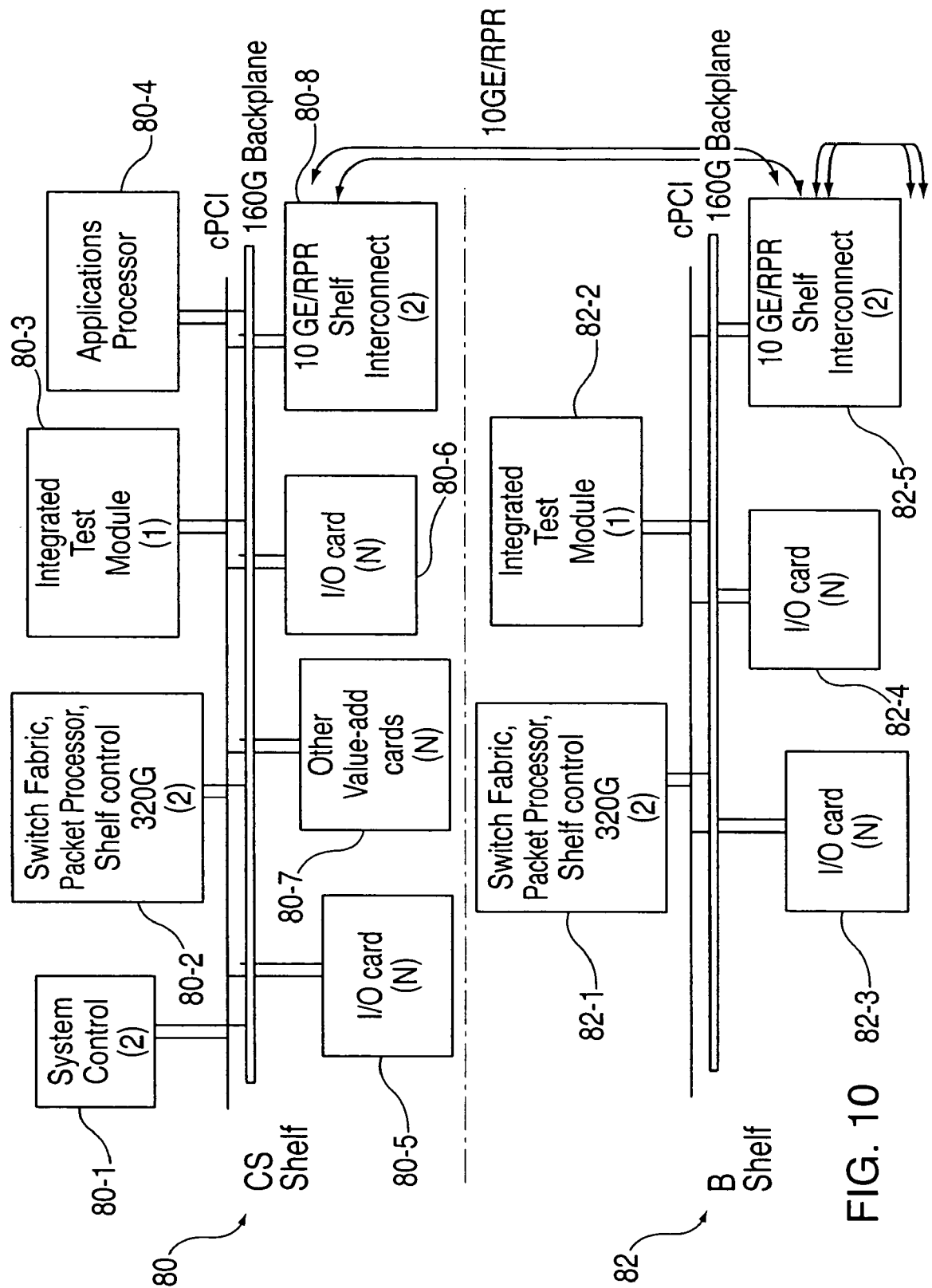
FIG. 10 illustrates the multi-shelf architecture of the TCU, according to an embodiment of the invention.

FIGS. 8-10 illustrate an exemplary configuration of the TCU 138 of FIG. 2 in an implementation consistent with the present invention.

FIG. 8 illustrates the various interfaces supported by the MIC2022™ Traffic Consolidator Unit (TCU) of the invention. The TCU 138 and RRUs 101-103 of the invention represent key components in carrying out the functionality of the Continuous Network Operation (CNO) application. With particular reference to the TCU 138, the TCU 138 terminates multiple rings or copper pairs from a plurality of RRUs 101, 102, two of which are shown. The TCU 138 serves as a cross-connect for the hub 136 or mobile switching office by supporting the ability to connect traffic from the packet ring 150 (or copper pair), to any network element connected to the TCU 138. As is well known in the art, a cross-connect system is used in hubs and MSOs to simplify interconnection between network elements. The TCU 138 can connect to existing BTS (Node B) 140-1 network elements using an RF interface; (e.g., a GSM Abis interface, a UMTS lub interface, or conventional T1/E1 or ATM interfaces). Furthermore, the TCU 138 can interface to next generation BTS/Node B baseband processors 140-2 that support a high-speed packet interface, which eliminates the need for an RF interface in the hub. This reduces cost and allows more flexible distribution of baseband processing resources. The GSM Abis and UMTS lub interfaces also allow the TCU 138 to connect to existing BSCs/RNCs in the mobile switching office. The TCU 138 will also support standard GSM A and UMTS Iu interfaces to connect to existing Mobile Switching Centers (MSCs)/Gateway MSCs, and GSM Gb and UMTS Iu interfaces to connect to Gateway Serving Nodes (GSNs). By supporting wireless standard interfaces such as the GSM Abis and UMTS lub, the TCU 138 can execute efficient bandwidth optimization techniques, such as identification and discarding of idle channels, improving bandwidth efficiency throughout the hub or MSO. The TCU 138 also supports legacy interfaces such as SONET/SDH to communicate with the PSTN 120. The TCU 138 can also be managed and monitored remotely from the Service Provider's Network Operations Center (NOC) 117. The TCU 138 will interface to a signaling server using a standard interface such as H.248/MEGACO, which is a media gateway signaling control protocol. The TCU 138 will be able to interface to Wi-Fi networks and transport Wi-Fi traffic through the wireless core network.

Referring now to FIG. 9 the TCU 138 is based on a three-layered architecture and includes a control and signaling shelf 80, one or more bearer (or B) shelves 82, and an optional application server 84. The TCU 138 terminates multiple rings or copper pairs from many RRUs 101-103 as shown in FIG. 8. The TCU connects to existing BTS (or Node B) network elements using an RF interface as well as a next generation BTS (or Node B) baseband processor that supports a high-speed packet interface. The TCU 138 also supports a variety of other interfaces such as T1/E1, GSM/GPRS/EDGE (Abis, A, and Gb), UMTS (Iub and Iu), ATM, etc.

Control and Signaling Shelf (CS-shelf)

Referring now to FIG. 10, the Control & Signaling Shelf (CS-shelf) 80 includes a system control module 80-1, a 320 Gigabit protocol independent switching fabric 80-2, an Integrated Test and Performance Monitoring card 80-3, a plurality of Input/Output cards 80-5, 80-6 and other value-added cards 80-7. In one embodiment, the CS-shelf 80 provides for 22 slots. If additional capacity is required, high-speed shelf interconnect cards 80-8 can be added to connect the CS-shelf 80 to the Bearer Shelf (B-Shelf) 82. The CS shelf 80 can support an optional Application Processor 80-4 for cases where an Application Server shelf 84 is not used.

Bearer Shelf (B-Shelf)

With continued reference to FIG. 10, the Bearer Shelf (B-Shelf) 82 in the described embodiment includes 22 slots and performs bearer channel processing, switching, testing, performance monitoring, and transport. It also includes a 320 Gigabit protocol independent switching fabric 82-1, an Integrated Test and Performance Monitoring card 82-2, Input/Output cards 82-3, 82-4, and high-speed shelf interconnect cards 82-5. One or more B-Shelves can be used in a single system. Communication between the CS-Shelf 80 and B-Shelves 82 is accomplished using an internal communications protocol as well as H.248/MEGACO for passing signaling information.

Application Server

The Application Server Shelf (AS-layer) 84 is an external application server(s) that supports a host of specialized software applications. These applications are accessed using the Session Initiation Protocol (SIP). Various applications can be supported such as Continuous Network Optimization, testing/performance monitoring, and network rerouting, which helps to automate spectrum and network optimization processes.

Millenium Management System

Figure 11:
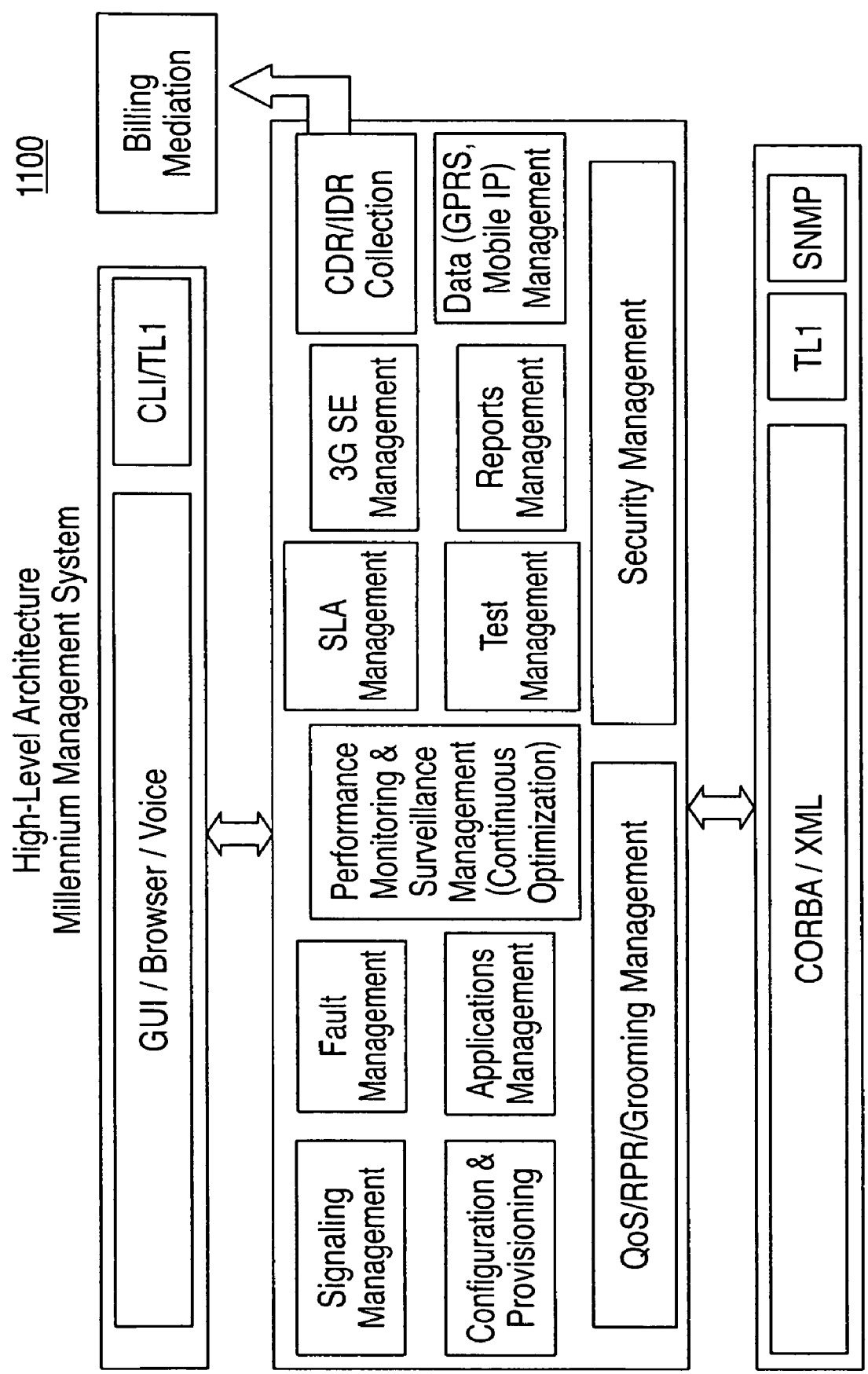
FIG. 11 illustrates the architecture of the Millennium Management System (MMS), according to an embodiment of the invention.

FIG. 11 is an illustration of the high-level architecture of the Millennium Management System (MMS) 1100. The MMS 1100 provides management and control of the RRUs 101-103 and TCUs 138. The MMS 1100 also enables 3rd party applications to be supported via software application programming interfaces (APIs).

The MMS 1100 performs key management and control functions for the RRUs 138 and TCUs 138, namely:
 Graphical User Interface (GUI)/Browser/Voice interface
 Command line interface
 Signaling management
 FCAPS (fault, configuration, administration, provisioning, security)
 QoS management
 Performance monitoring
 Test management
 Reports
 SLA management
 Data and 3G service enablers
 Billing mediation
 Call detail recording, Internet Detail recording
 CORBA/XML/TL1/SNMP
 OSMINE support
 Continuous Network Optimization Referring now to FIG. 12, the Continuous Network Optimization (CNO) module 1200 is configured to continuously monitor network performance indicators such as congestion and increased/decreased capacity requirements and automatically provision sufficient bandwidth in response. The CNO module is also capable of providing additional baseband processing resources in the hub 136 to meet fluctuations in service demand.

Typical network events which may cause fluctuations in network capacity requirements may include, for example, rush hour traffic or a major industry tradeshow. During such network events, capacity requirements increase in certain parts of the network due to the movement of mobile users. The CNO 1200 is capable of sensing the network events as they occur in various parts of the network and in response, automatically provision sufficient network bandwidth to handle the increased traffic load as a consequence of the network event. It is noted that by virtue of the increased demand in certain portions of the network, other locations in the network typically require less capacity as a result. The CNO 1200 is capable of sensing the corresponding decrease in demand and responsively reduce the use of radio resources and the amount of bandwidth being used in the underutilized regions.

Figure 12:
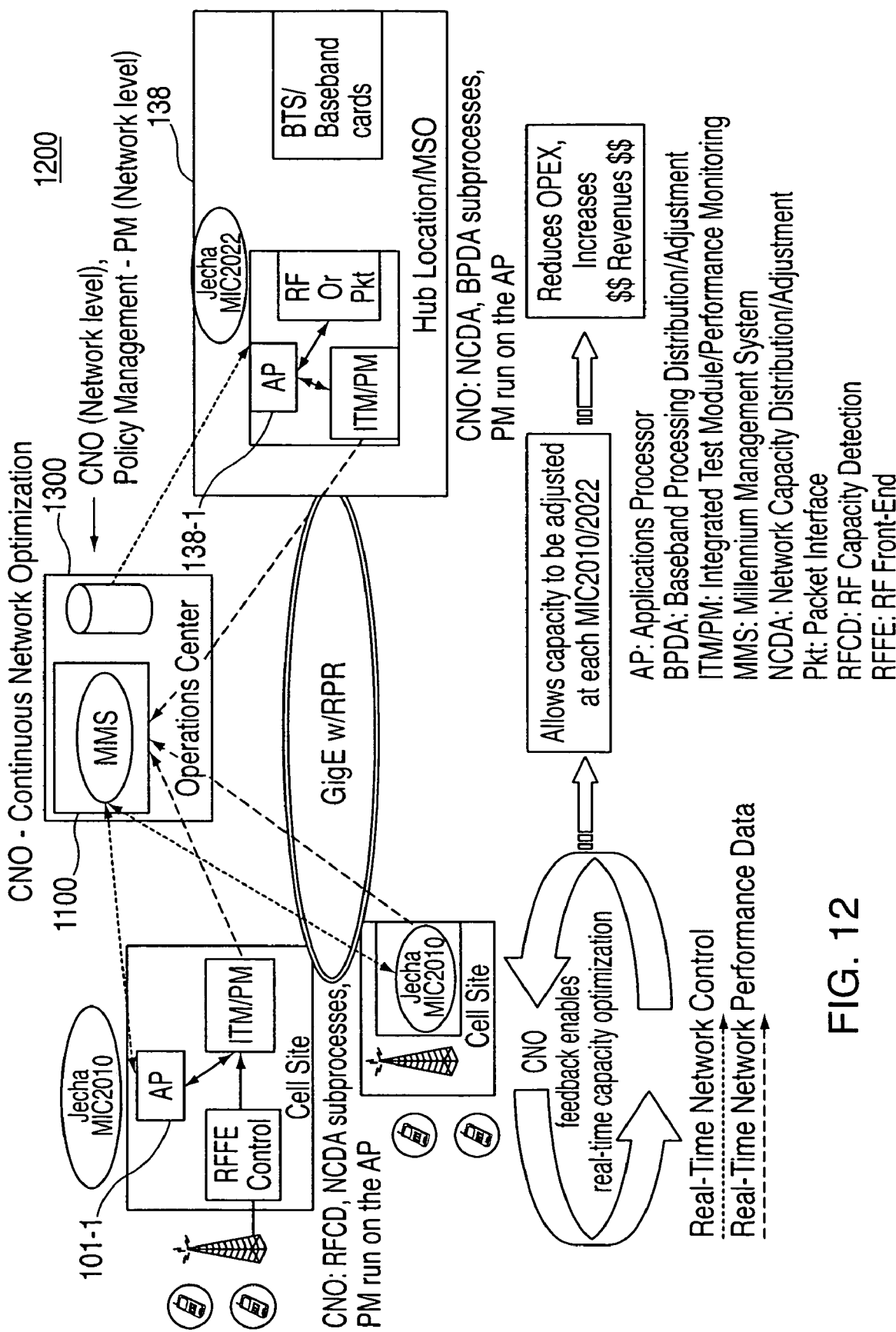
FIG. 12 is a flow diagram of the Continuous Network Optimization process, according to an embodiment of the invention.

With continued reference to FIG. 12, the RRUs 101-103 and TCUs 138 will run local versions of the CNO 1200. In particular, the CNO 1200 "RFCD" sub-process, the CNO 1200 "NCDA" sub-process and the CNO 1200 "PM" sub-process, each of which are described below, run locally, for example, on AP 101-1 of RRU 101. The CNO 1200 "NCDA" sub-process, CNO 1200 "BPDA" sub-process and CNO 1200 "PM" sub-process run locally, for example, on AP 138-1 of TCU 138. It is noted that each local version of the CNO is operative to manage the bandwidth of its associated RRU (or TCU).

As shown in FIG. 12, the local CNO processes and policies are centrally administered by the Millennium Management System (MMS) 1100 in the Network Operations Center 1300.

As stated above, the CNO 1200 continuously evaluates the state of the network based on a number of performance indicators. The performance indicators are derived from the AP module 101-1, 138-1 in conjunction with the local Integrated Test/Performance Monitoring module. Network bandwidth changes and adjustments are performed based on the monitored performance indicators and a set of predefined policies configured in the AP 101-1, 138-1, to be described below.

The local CNO process in each RRU (or TCU) is configured to communicate with local CNO processes in other RRUs and TCUs in the network. This will allow the local CNO to set the bandwidth for a local cell site based on input from adjacent cell sites. This feature is particularly advantageous for one of the pre-defined policies in the AP, referred to herein as the "rolling wave" policy. The rolling wave policy is intended to be used to maintain bandwidth and processing resources throughout a mobile network where usage patterns mimic a rolling wave. That is, in certain situations demand for resources in a cell rise and fall over a period of time and repeats or moves to adjacent cells (e.g., along a highway during rush hour). A more complete description of the rolling wave policy is provided below.

Three main sub-processes are used to implement continuous network optimization (CNO) and are described as follows.

I. RF Capacity Detection (RFCD) Sub-process

To determine if an increase/decrease in RF capacity has occurred in the Smart Antenna 200, the CNO 1200 RFCD sub-process operates with the RF Front-End control function located within the RRU 101-103. The RF Front-End control function, in turn, operates with the RF Front-End/Smart Antenna complex. The RRU 101-103 RF Front-End control function detects if the Smart Antenna has increased or decreased RF capacity using a control link. The RRU interfaces to the RF Front-End/Smart Antenna complex with an RF or Intermediate Frequency (IF) signal via a coaxial cable and a separate control link such as an RS-232 interface. Control and status information is exchanged over the control link from the RRU to the RF Front-End/Antenna.

In operation, the CNO 1200 RFCD sub-process monitors the RF traffic capacity requirements by monitoring a set of parameters, defined below, and uses this information to determine if an increase/decrease in RF activity has occurred. The status of the current RF traffic capacity is fed into the CNO 1200 Network Capacity Detection and Adjustment (NCDA) sub-process (See item II).

It is noted that the CNO 1200 RFCD sub-process can operate with either conventional antennas and/or smart antennas to provide improvements in signal quality which enables an increase in the number of users or higher data rates from existing users.

Table II lists several parameters that are used by the CNO 1200 RFCD sub-process to monitor the RF traffic capacity. The parameters listed in Table II are compared to predefined thresholds and decisions are made based on the comparison.

TABLE II

| Parameter | Parameter Definition |
| --- | --- |
| Digital Signal Level Monitor | monitors the RF signal after it is converted to a digital signal. |
| RF Front End Antenna Monitor | monitors RF Front-End and/or antenna presence |
| RF Carrier Capacity Indicator | Monitors active carriers |
| Network Capacity channel indicator | Monitors active/idle network channels |
| Congestion_indicator | Monitors network congestion level |
| Alarm_Threshold_monitor | Monitors various alarms and thresholds that trigger events |

II. Network Capacity Detection and Adjustment (NCDA) Sub-process

The NCDA sub-process uses the RF capacity status information obtained from the RFCD sub-process defined above to determine if a change in network-side capacity is required. If it is determined that a change in network bandwidth is necessary, the NCDA sub-process automatically adjusts the bandwidth between the following sites: (1) Cellsite and hub, (2) Hub to Mobile Switching Office (MSO), (3) Hub to hub, (4) MSO to MSO.

III. Baseband Processing Distribution and Adjustment (BPDA) Sub-process

The Baseband Processing Distribution and Adjustment (BPDA) sub-process uses RF capacity and network status information obtained from the RFCD sub-process and NDCA sub-process, respectively, to determine what level of baseband processing resources are required. The TCU 138 connects to a number of existing BTSs (or Node Bs) 101-103 or next generation BTSs that incorporate a packet interface and do not require an RF signal, to enable sharing of baseband processing resources.

The CNO 1200 BPDA sub-process is the basis for the Virtual Baseband Processing capability. By placing the BTS (or Node B) resources into hub locations, as illustrated in FIG. 2, the TCU 138 an more efficiently access these resources and share them as baseband processing capacity requirements increase or decrease. This creates a pooling capability that helps to reduce underutilized BTS (or Node B) resources.

Policy Management

To utilize the features of Continuous Network Optimization (CNO), policies are created and imposed on the network to meet a variety of needs. Generally, policies are created for scheduled and unscheduled localized events and for loss of network resources. It is understood that policies to meet needs other than those described herein are within contemplation of the invention.

Figure 13:
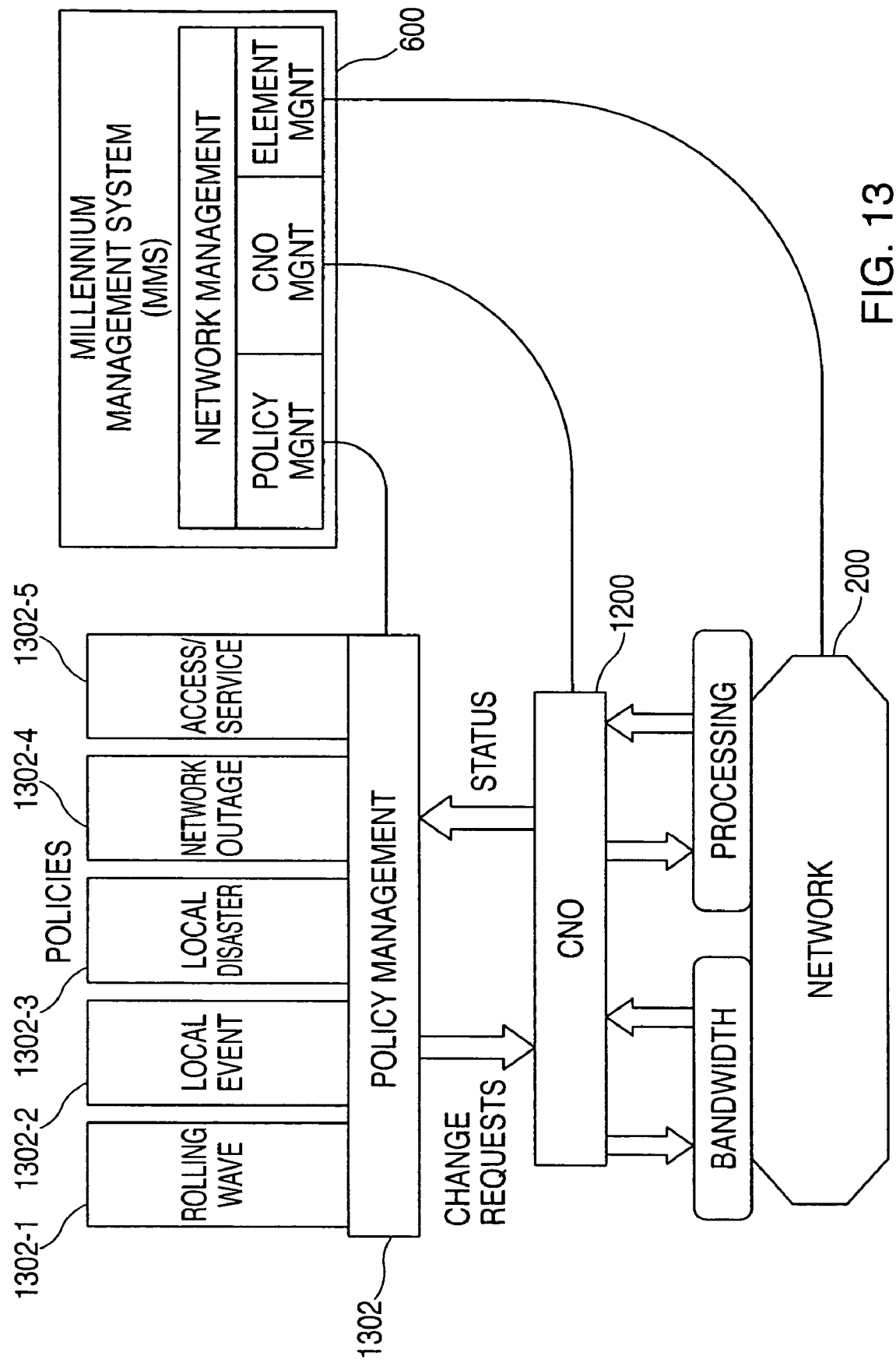
FIG. 13 is an illustration of the hierarchical relationship of the policy management module, the CNO and the network.

FIG. 13 illustrates a network hierarchy including the network 200, policy management module 1302 and CNO 1200. As shown, the policy management module 1302 is further comprised of a number of pre-defined policies 1302-1, 1302-2, . . . , 1302-5, which are created and imposed on the network 200 to meet a variety of needs, as will be described below. As shown in FIG. 13, the pre-defined policies include, in one embodiment, a "rolling wave" policy 1302-1, a "Local event" policy 1302-2, a "local disaster" policy 1302-3, a "network outage" policy 1302-4, and an "access service" policy 1302-5.

In operation, the policies are managed by the policy management module 1302 which receives network status information from the CNO 1200 and in response, issues requests for network changes to the CNO 1200.

Figure 14:
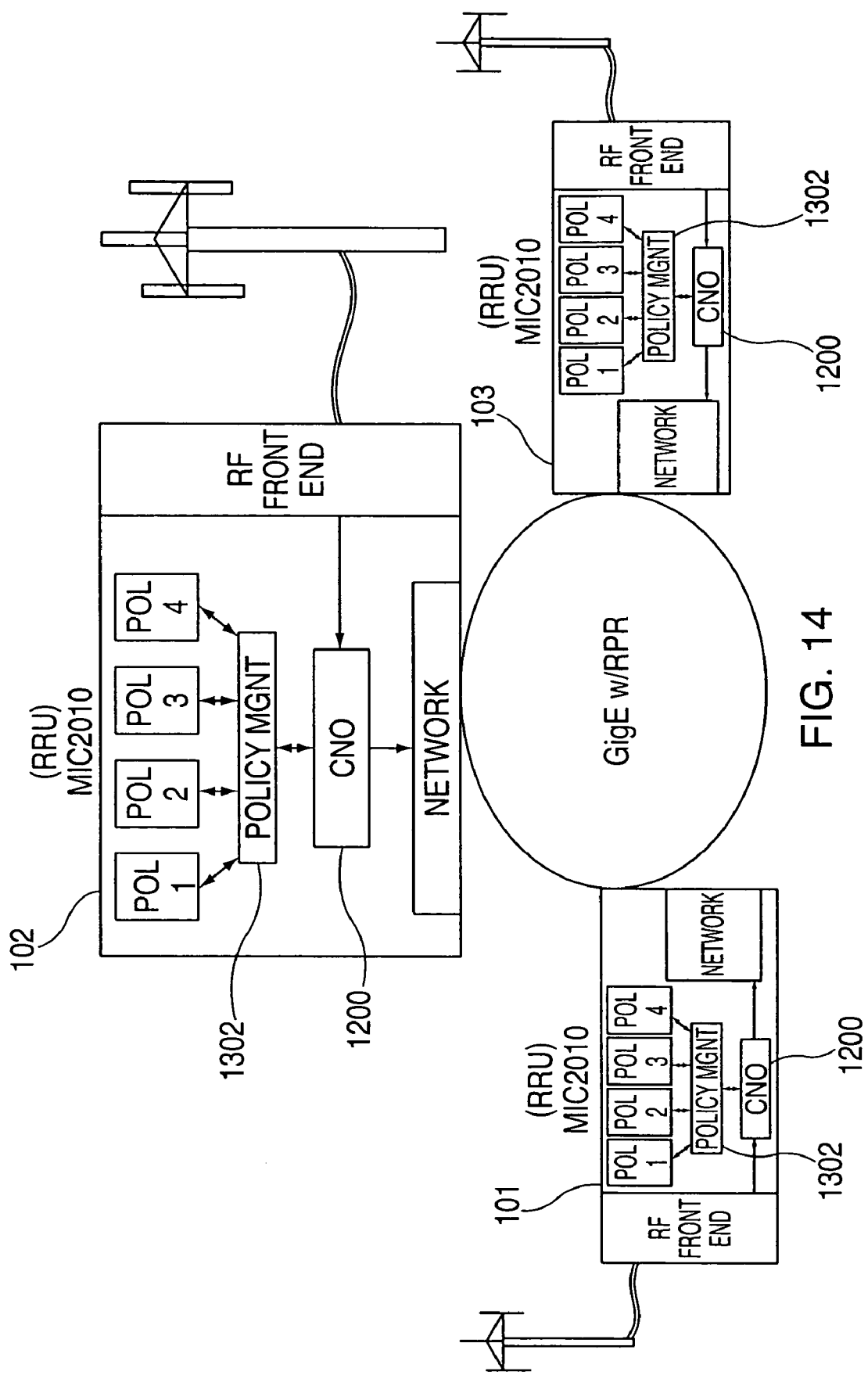
FIG. 14 is an illustration of how the local CNO and Policy Management processes interact with the RF Front-End and GigE packet ring to derive network status information.

FIG. 14 illustrates how the policy management 1302 and CNO 1200 processes are implemented in the RRUs 101-103. Each RRU 101-103 contains an instance of the policy management 1302 and CNO 1200 processes that monitor the RF activity on the air interface, make adjustments to the bandwidth on the network interface, and signals requests for adjustments of the baseband processing capacity. The CNO process 1200 in each MIC uses the configured policy parameter values to adjust the bandwidth and baseband processing capacity. Although not shown in the diagram, the TCU 138 in the hub also has an instance of policy management 1302 and CNO 1200 processes running.

Depending on which policy is implemented, certain parameters are used to provide status information. Values for the parameters are derived from various hardware components, other software processes in the RRU, or assigned by a network operator during the provisioning of the network. For example, for an alternate routing policy, the primary hub ( ) and backup hub ( ) parameters will be used to determine how packets should be sent through the network. These values would be derived from the Management System and contain the destination address of the primary and backup hubs.

The parameters, according to one embodiment, include:

maximum and minimum bandwidth( )
bandwidth increment( )
day( )
date( )
time( )
policy duration( ) (that the policy is in effect)
adjacent cells( )
maximum bandwidth threshold( )
minimum bandwidth threshold( )
maximum baseband processing( )
minimum baseband processing( )
maximum baseband processing threshold( )
minimum baseband processing threshold( )
primary hub( )

backup hub( ),
applicable CNO parameters defined above, and
user defined parameters( ).

These parameters are used by the CNO process 1200 to adjust the bandwidth and baseband process capacity in the network. The CNO process 1200 receives constant updates on the status of the RF portion of the network and the baseband processing capacity. The CNO process reads the values of policy parameters and compares them to the current settings in the network to determine if an adjustment is required and how to make the adjustment.

$1^{ST}$ Policy—Rolling Wave

The Rolling Wave policy is used to maintain bandwidth and processing resources throughout the network where usage patterns mimic a rolling wave. The inventors have identified that the demand for resources in a cell rise and fall over a period of time and moves, in wavelike fashion, to adjacent cells. This type of pattern characterizes rush hour traffic. The rolling wave policy is typically applied to cells along a specific path. For example, in the morning at the start of the rush-hour, resources are increased at the first cell and then to each successive cell in the path as the traffic builds along the path. Resources at the first cell are decreased as the rush-hour traffic subsides and moves to each cell along the path. The pattern is reversed for the afternoon rush-hour traffic. The policy can be implemented by increasing resources based on a schedule or it can be done dynamically in response to the subscribers demands for service.

The policy may be otherwise implemented by adding a fixed amount of bandwidth based on a schedule with additional bandwidth added dynamically to meet fluctuating demand.

Rolling Wave Policy Example

One specific example of how the rolling wave policy may be implemented is as follows. Consider a network of cell sites configured to cover a major traffic corridor between an urban business district and the suburbs. Commuters travel along the corridor toward the city in the mornings and away from the city in the afternoon. The rush-hour commute can be two to three hours. During this time, the cell sites along the corridor experience an increase in demand for bandwidth as the rush-hour traffic increases and mobile users pass through each cell along the route. As the rush-hour winds down, the commuter traffic decreases and so does the bandwidth demand in the cells. This pattern of increase and decrease in bandwidth occurs in the cells along the traffic corridor like a moving wave. In the face of this "rolling wave" of mobile users, the CNO works to maintain a level of bandwidth in each cell based on the policies established by the network operator. In general, the "rolling wave" policy is used to change the bandwidth at each cell site and processing capacity at the hub in response to changes in the demand for service by mobile users. At the start of the rush-hour, the CNO process will detect an increase in mobile connections at the first cell along the corridor. This can be done by sensing an increase in RF signals, an increase in the number of service requests on the mobile control channel, an increase in the number of active channels or from messages from an external operations system. The CNO process reports the increased activity to the policy management system. The policy management system determines if the "rolling wave" policy is applicable and passes the configuration parameters to the CNO process. The CNO will adjust the bandwidth based on the policy parameters in response to the conditions in the radio access network. This continues for the duration of the policy or until the receipt of new instructions from the policy management system. In the morning rush-hour commute the rolling wave policy begins at a cell in the suburbs designated by the network operator. In the afternoon it will begin at a cell at the edge of the city designated by the network operator. The CNO process will increase the bandwidth of the network connection at the first cell, instruct the hub site to increase the processing capacity if necessary, and instruct the adjacent cells to increase the network bandwidth at their sites. This is in anticipation of the increase in mobile traffic that will be passing through the cells. The CNO process continues to monitor the mobile RF traffic until it falls below the established threshold signaling the end of the rush-hour.

$2^{nd}$ Policy—Local Event

Another policy that may be implemented is the so-called "local event" policy which can be a scheduled local event or an unscheduled local event. A scheduled local event can be, for example, a concert, festival, sporting event, trade show or conference. These events are characterized by an increase in demand for resources in a defined area of a few city blocks, a neighborhood, or metro area. The demand will be experienced for several hours and then dissipate or it can fluctuate daily for one to two weeks. A policy for this type of event will allow scheduling the addition of network resources for the duration of the event. By contrast, an unscheduled local event can be, for example, a localized disaster caused by fire, hazardous spill, or terrorist attack. When the CNO process detects an increased demand for resources in the affected areas, the policy will direct CNO to increase network resources to those areas. The policy will also allow the network operator to decide how much of the available resources will be devoted to emergency traffic. This can be done by reserving some resources for emergency traffic or recovering resources in use and directing them to emergency traffic. The CNO process will have the capability of detecting and reporting increased emergency traffic.

$3_{rd}$ Policy—Network Outages

Network outages can be scheduled or unscheduled events. Scheduled network outage events typically occur when equipment is removed from service for planned maintenance. A policy for this will shift resources from the affected cell or cells to the adjacent cells in anticipation of increased traffic from those cells. By contrast, an unscheduled network outage event typically occurs when equipment is removed from service due to failure or unplanned maintenance.

$4^{th}$ Policy—Grooming and Routing

Grooming and routing policies are used to change the path of traffic through the access network between cell site antennas and hub sites where the pool of BTSs (or Node Bs) are located and between hub sites and MSOs. The grooming and routing policies are used to route traffic between cell site antennas and backup hubs in the event of a failure at the primary hub. If there is a failure at an MSO the policies can also be used to route traffic between hubs and backup MSOs. The policies will include information to determine location of backup sites, location of BTSs, minimum and maximum bandwidth between sites and optional parameters defined by the network operator.

FIG. 11 is an illustration of grooming by RF technology type (e.g. GSM, UMTS, etc.) or by Service Provider, where, multiple Service Providers share equipment at a single cell site. The figure illustrates a policy that supports RF carrier or technology type grooming or segregation of traffic by Service Provider as opposed to a change in routing in real-time $5^{th}$ Policy—Priority Access Priority access policies are used to determine how the radio access network will be configured to transport traffic between cell site antennas, hubs and MSOs. The priority access policies will define the parameters for setting minimum and maximum bandwidth, quality of service (Qos), priority level, alternate routes, and any optional network settings defined by the network operator. These policies are used to control access based on a number of factors, including individual subscribers, subscriber groups, service types or classes, time of day, ingress and egress location, carrier frequency and other operator defined criteria. The priority access policies are checked by the policy management system when a request is received for priority access. Requests for priority access can be sent to the policy management system from the CNO process or from external customer care systems through an application programming interface (API). The request will provide sufficient information for the policy management system to determine which policy to apply. After checking the priority access policy, the policy management system sends a request to the CNO process to configure the network elements to meet the criteria in the policy.

Additional functions of the RRUs 101-103 and TCUs 138 are described as follows.

(A) QoS/Resilient Packet Ring Function (QRF)

Figure 15:
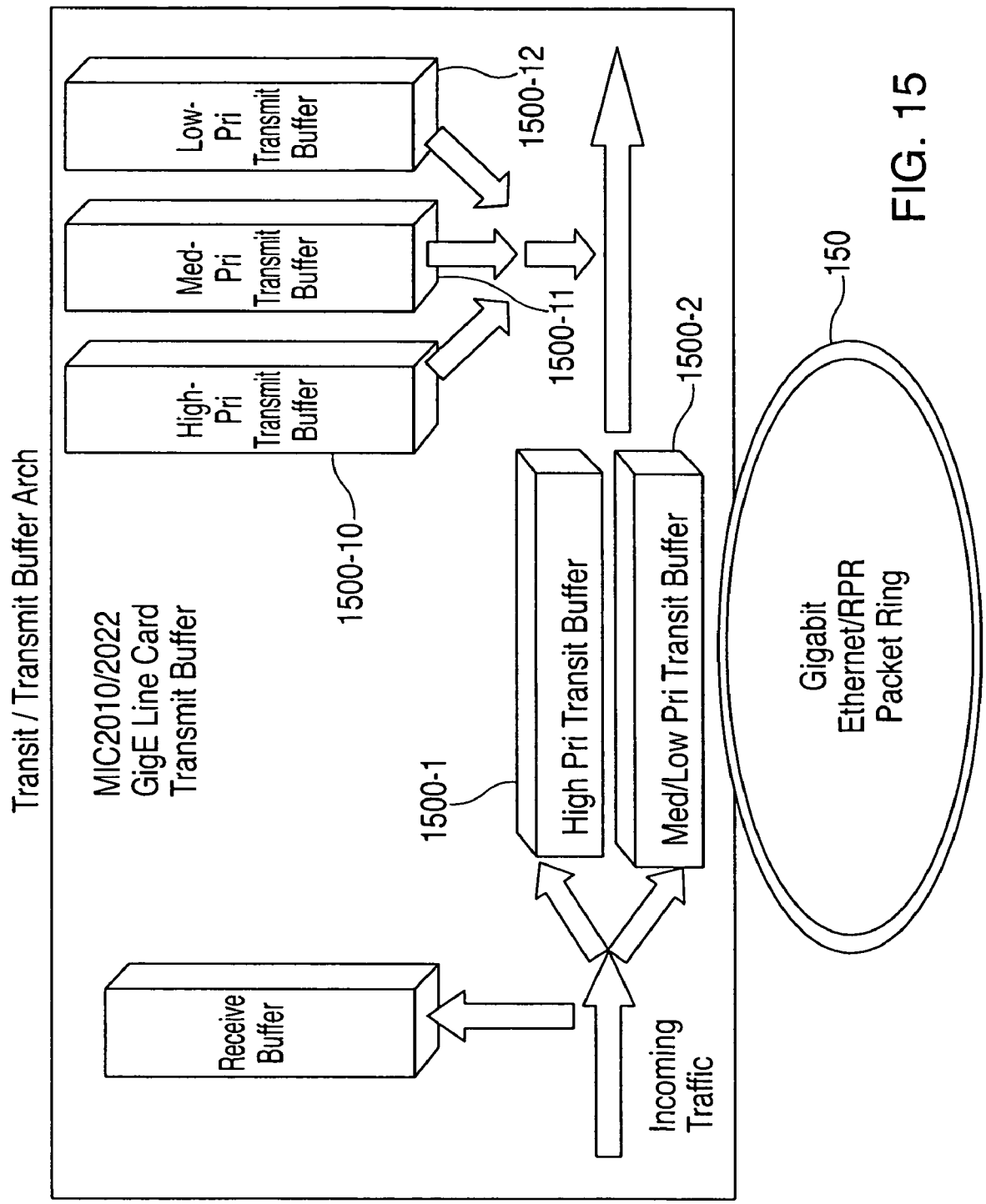
FIG. 15 is the Transit/Transmit buffer architecture used in the RRU and TCU for Quality of Service (QoS) priorities.

FIG. 15 is an illustration of a transit buffer arch used in the used in the RRUs 101-103 and TCUs 138 for Quality of Service (QoS) priorities. RPR header information is examined to determine priority levels and other information.

The QoS/RPR function is software that runs on an Applications Processor that is resident in each of the RRUs 101-103 and TCUs 138 and is performed in compliance with the well known RPR standard. The QoS function allows control and traffic channels to be mapped into high, medium, and low priority QoS flows. This is accomplished by using high, medium, and low-priority transmit buffers 1500-10, 1500-11, 1500-12. These QoS classes are mapped into high and medium/low transit buffers 1500-1, 1500-2 which control the flow onto the packet ring 150.

Figure 16:
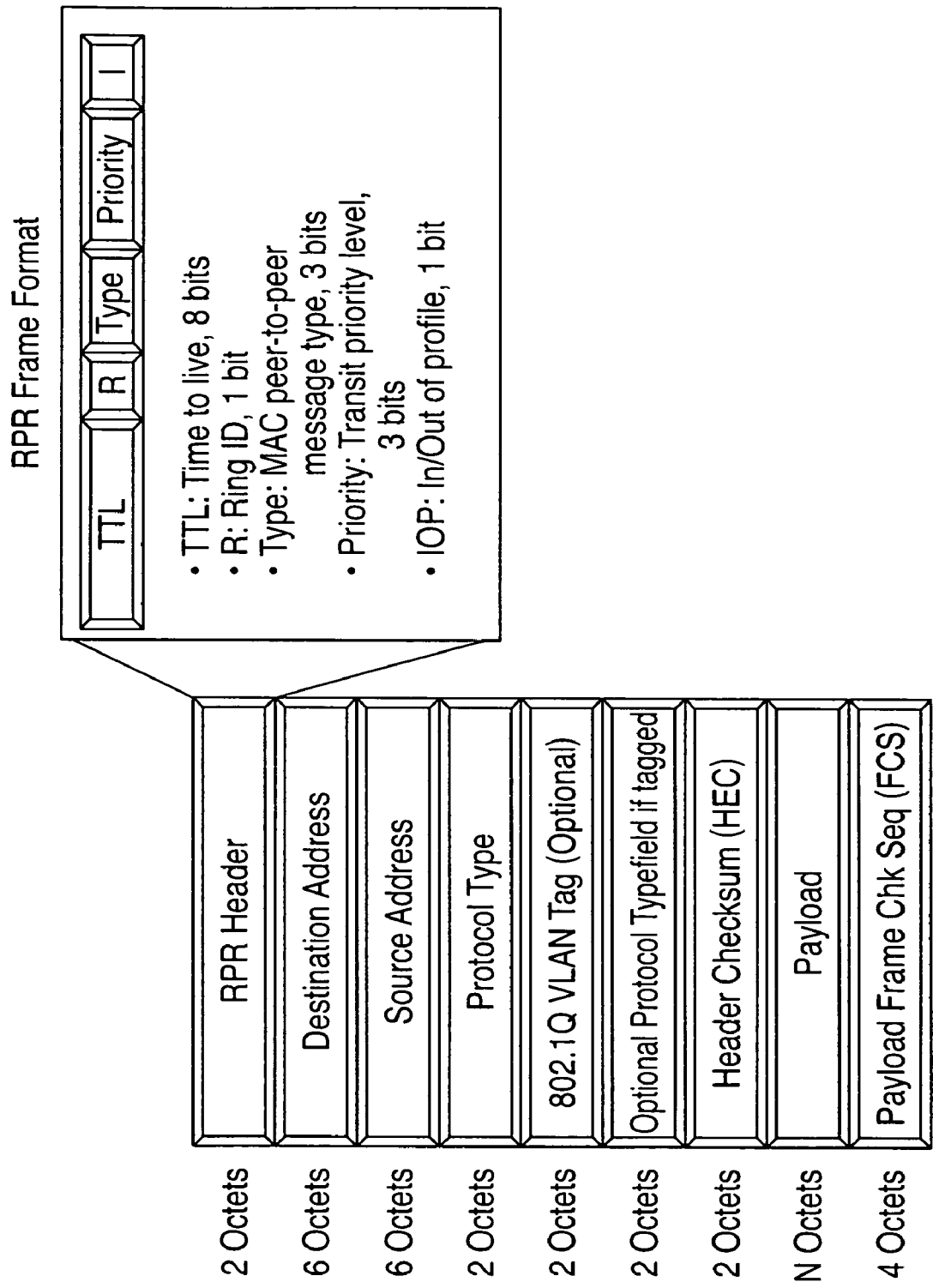
FIG. 16 is a Resilient Packet Ring (RPR) frame format.

FIG. 16 is an exemplary illustration of an RPR packet frame format. Specifically, the first 2 octets of an RPR packet frame (i.e., the header) is used to identify the level of priority for the transmitted data and control information. As is well known in the art, RPR Frames are transmitted in multiple octets.

(B) GSM and UMTS Frame Processing

An application will allow GSM and UMTS frame processing to provide intelligence about these wireless specific interfaces. This will enable more efficient grooming and bandwidth optimization methods to be implemented.

(C) Virtual Antenna Switching

The solution enables the signals from any antenna to be routed to any BTS (or Node B) port in any hub location. This is referred to as virtual antenna switching. By placing the BTS (or Node B) resources into hub locations, the TCU 138 can more efficiently access these resources and share them as baseband processing capacity requirements increase or decrease. This creates a pooling capability which helps to reduce underutilized BTS (or Node B) resources.

(D) Straight Talk Service

Straight Talk Service allows two or more mobile users 11-114 to establish direct voice communication by sending packetized voice directly from one mobile station to another without going through the circuit switched voice network. The RRU 101-103 or TCU 138 can detect the mobile subscriber IP address and use that to route packet voice through the network to the appropriate destination. The mobile station must support the ability to allow users to invoke this feature by pushing a button to initiate voice packetization before communication begins.

(E) Priority Access Service

Figure 18:
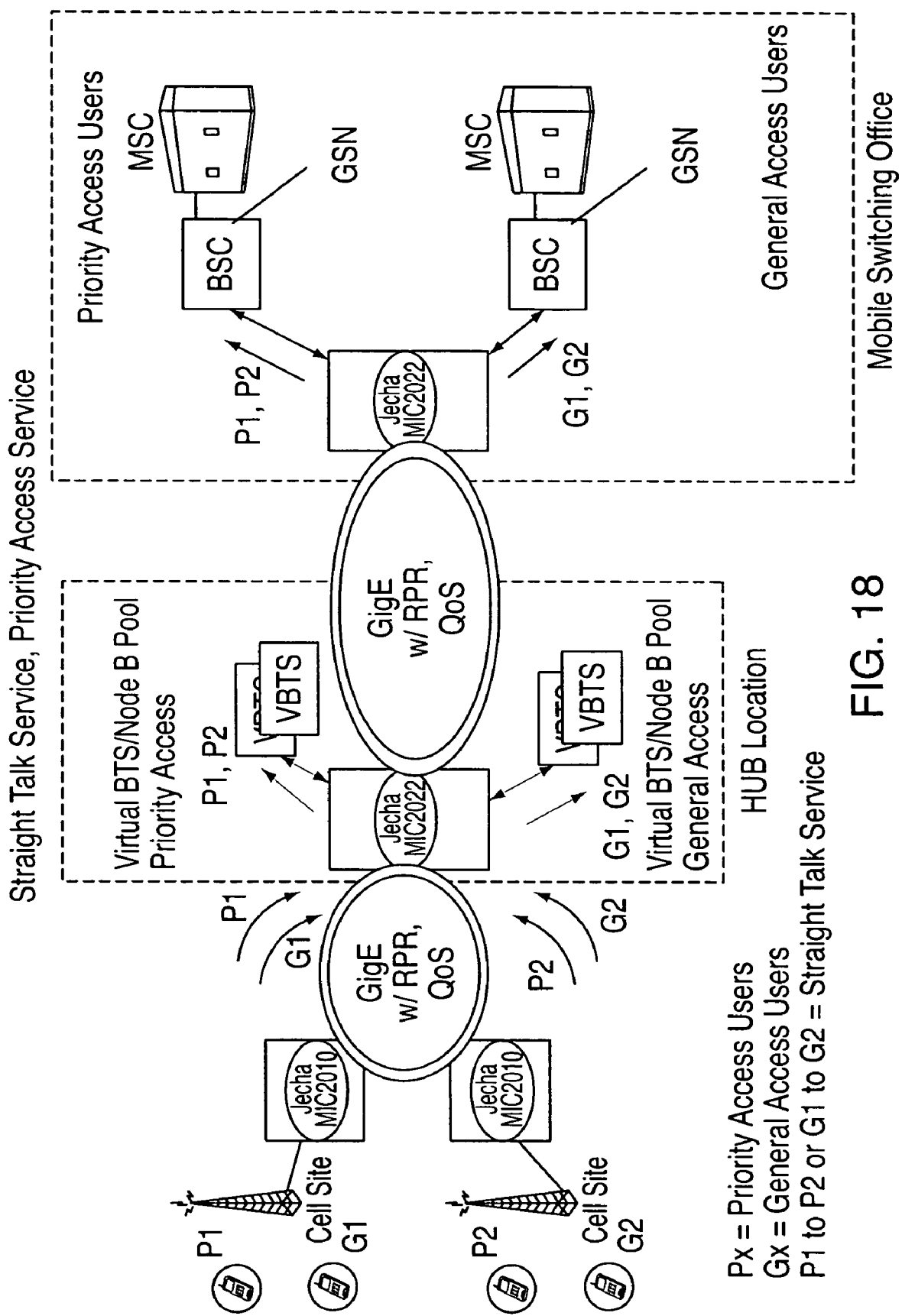
FIG. 18 illustrates the Straight Talk service and Priority Access service features.

Priority Access Service allows various technology types to be prioritized into flows such as GSM/GPRS/EDGE, UMTS, Public Safety, etc. and routed to appropriate equipment for processing. An alternative implementation allows the user population to be prioritized into general and higher priority users. This is accomplished by the RRU 101-103 identifying the International Mobile Subscriber Identity (IMSI) and/or the Mobile Subscriber ISDN number (MSISDN) of the user, which allows user traffic to be separated and routed in specific Quality of Service (QoS) priority flows. Straight Talk Service and Priority Access are illustrated in FIG. 18

Figure 17:
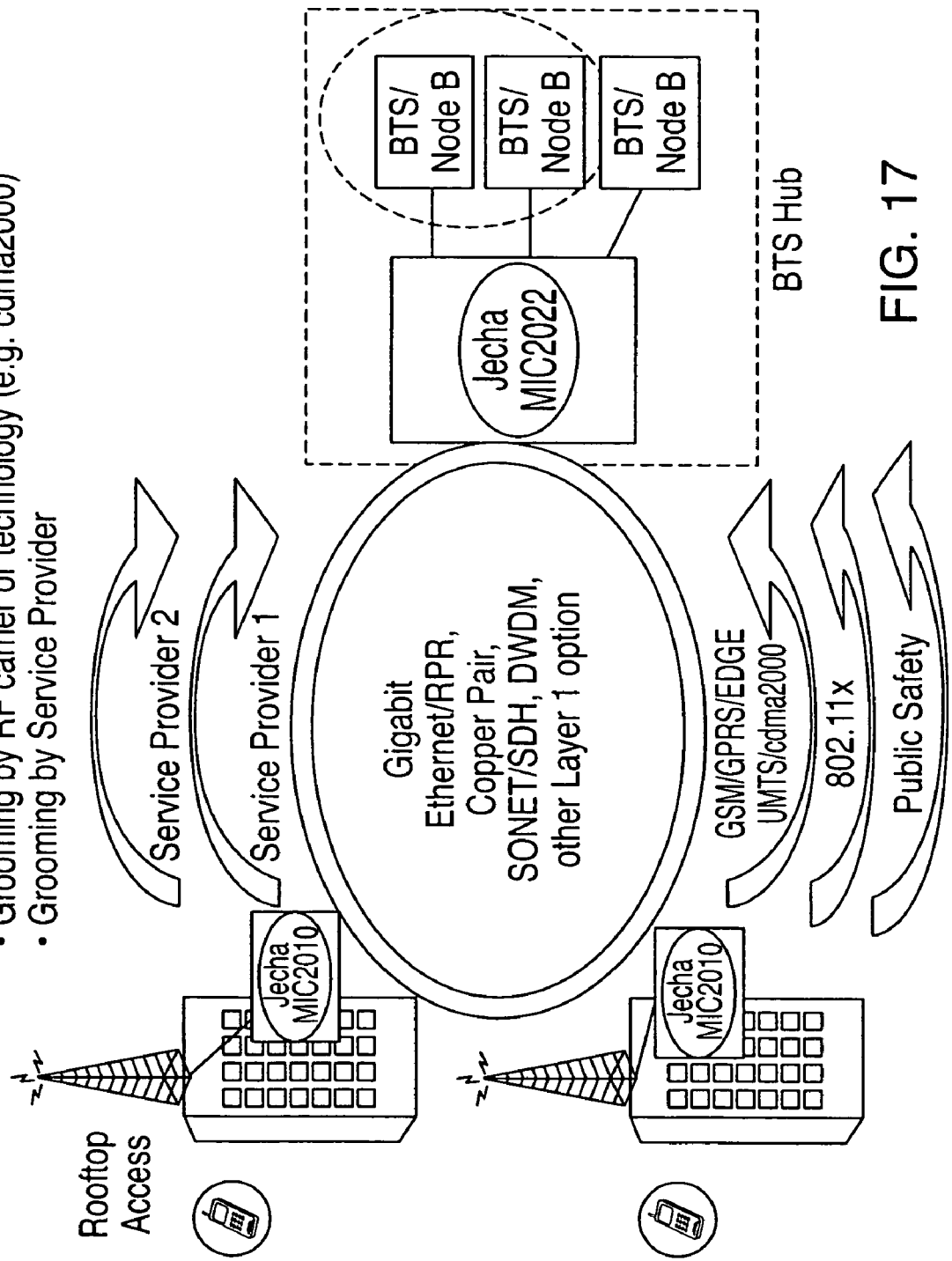
FIG. 17 illustrates the grooming feature according to exemplary segregation criteria.

FIG. 17 is an example of two possible types of grooming: 1) grooming of traffic by RF technology type (e.g. GSM, UMTS, etc.), 2) grooming of traffic by Service Provider, for cases where multiple Service Providers share equipment at a single cell site.

It will be apparent to those of skill in the art that the disclosed apparatus and method has numerous applications in the area of cellular communications.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims. In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

What is claimed is:

1. A wireless communication system, the system comprising:

a plurality of Remote Radio Units (RRUs), each including a packet transceiver module, each transceiver module located at one of a plurality of cell sites in said wireless communication system, each of said transceiver modules communicatively coupled to a hub via a first transport communication medium, said first transport communication medium transporting information in form of packetized bit streams, said transceiver modules being configured to receive RF radio signals over a wireless link and process the received RF signals to produce packetized demodulated bit streams for transmission over the transport communication medium;

the hub including:

at least one traffic consolidator unit (TCU) configured to receive the packetized demodulated bit streams transmitted by the packet transceiver systems via the first transport communication medium and process the received digital packetized demodulated bit streams to reproduce the RF radio signals transmitted over said wireless link; and a base transceiver station (BTS) communicatively coupled to a second transceiver module and configured to process the reproduced RF radio signal to produce a corresponding T1/E1 signal on said second transceiver module;

a mobile switching office (MSO) in communication with the hub via a second transport communication medium and configured to receive and process the T1/E1 signal to produce a channelized circuit-switched T1/E1 signal;

wherein the traffic consolidator unit includes an application server shelf configured to support a plurality of customized software applications, including a continuous network optimization (CNO) application for continuously monitoring network performance as represented by a plurality of network parameters related to RF capacity for automatically providing sufficient bandwidth and determining what level of baseband resources are required; determining if an increase/decrease in RF activity has occurred based on said monitored parameters; and automatically adjusting the bandwidth between one of the following sites, Cellsite and hub, Hub to MSO, hub to hub or MSO to MSO; and a network re-routing application to automate spectrum and network optimization processes based on commands from said CNO.

2. The wireless communication system of claim 1, wherein the first and second transport communication mediums are Ethernet over copper traffic flow.

3. The wireless communication system of claim 1, wherein the first and second transport communication mediums are optical fiber rings.

4. The wireless communication system of claim 3, wherein the optical fiber ring is a SONET/SDH ring.

5. The wireless communication system of claim 3, wherein the optical fiber ring is a Gigabit Ethernet Resilient Packet Ring with Quality of Service (QoS) priorities.

6. The wireless communication system of claim 3, wherein the fiber optic ring is a 10 Gigabit Ethernet ring.

7. The wireless communication system of claim 1, further comprising a plurality of remote cell site antennas disposed at said plurality of cell sites, said antennas coupled to said packet transceiver systems and configured to transmit said RF radio signal from mobile users over said wireless link to said packet transceiver systems.

8. The wireless communication system of claim 1, wherein the cell site antennas are equipped with smart technology.

9. The wireless communication system of claim 1 wherein the cell site antennas are configured to detect changes in RF capacity in the network.

10. The wireless communication system of claim 1, wherein each packet transceiver system further comprises:

an RF front end module configured to receive an RF signal, down-convert the received HF signal and forward the down-converted RF signal to an A/D module;

a programmable antenna card (PAC) configured to demodulate an RF signal to extract a digital bit stream;

a plurality of Input/Output (I/O) modules;

a control and switching module configured to manage operations within the first transceiver unit;

an integrated test and performance module configured to collect network performance data to facilitate network installation and troubleshooting;

a gigabit Ethernet card configured to groom data traffic channels and control channels into GigE/RPR traffic flows in accordance with bandwidth requirements for the respective channels.

11. The wireless communication system of claim 1, wherein the traffic consolidator unit comprises:

a control shelf comprising:

a system control module;

an independent switching fabric;

an integrated test and performance monitoring card; and a plurality of input/output (I/O) cards;

a bearer shelf configured to perform bearer channel processing, switching, testing, performance monitoring and transport.

12. The wireless communication system of claim 1, wherein the customized software applications further comprise:

a testing/performance monitoring application and a network rerouting application for facilitating near/far-end testing, setup, installation, and troubleshooting.

13. The wireless communication system of claim 12, wherein the network performance indicators are derived from the application processor and the integrated test and performance monitoring card.

14. The wireless communication system of claim 12, wherein a local version the CNO application is resident in each of said packet transceiver systems and traffic consolidator units in the system.

15. The wireless communication system of claim 12, wherein the CNO application is comprised of said three sub-processes:

an RF capacity detection (RFCD) sub-process configured to determine if an increase/decrease in RF capacity is required in the network;

a network capacity detection and adjustment (NCDA) sub-process configured to utilize the RF capacity status information obtained from the RFCD sub-process to determine if an increase/decrease in network-side capacity is required in the network; and a baseband processing distribution and adjustment (BPDA) sub-process configured to utilize the RF capacity and network status information obtained from the RFCD and NCDA processes to determine what level of baseband resources are required.

16. A method for transporting digital bit streams extracted from radio frequency (RF) signals between antennas and processing elements in a wireless communications network, the method comprising:

receiving a RF (Radio Frequency) signal at a packet transceiver system over a wireless link via an antenna, said first transceiver located at one of a plurality of remote cell sites;

processing the received RF signal by a continuous network optimization (CNO) at said packet transceiver system and to produce a packetized demodulated bit stream supporting serial transmission of the bit stream over a first transport communication medium;

transmitting the bit stream over the first transport communication medium to a traffic consolidator unit located at a hub in the network;

upon receipt of the transmitted bit stream at the traffic consolidator unit, processing the received bit stream at the traffic consolidator unit to reproduce the RF signal received at the packet transceiver system;

providing the reproduced RF signal as an input to a base transceiver station (BTS) located at said hub;

processing the reproduced RF signal at the BTS to produce a T1/E1 signal;

providing the T1/E1 signal as an input to the traffic consolidator unit;

packetizing the T1/E1 signal at the traffic consolidator unit to produce a packetized T1/E1 signal;

transmitting the packetized T1/E1 signal over a second transport communication medium to a mobile switching office (MSO); and upon receipt of transmitted bit stream at the MSO, processing the received packetized T1/E1 signal to produce a channelized circuit-switched T1/E1 signal;

monitoring a plurality of network parameters related to RF capacity using a continuous network optimization (CNO) application that includes three sub-processes that continuously monitors network performance indicators for automatically provisioning sufficient bandwidth and determining what level of baseband resources are required;

determining if an increase/decrease in RF activity has occurred based on said monitored parameters; and said CNO automatically adjusting the bandwidth between one of the following sites, Cellsite and hub, Hub to MSO, hub to hub or MSO to MSO.

17. The method according to claim 16, wherein the RF signal is transmitted from a mobile station over the air to the first transceiver unit via a fixed RF antenna device.

18. The method according to claim 16, wherein the first and second transport communication mediums are one of a fiber optic link and a high-speed copper pair(s).

19. The method according to claim 16, wherein the act of processing the received RF signal at the packet transceiver system, further comprises the acts of:

demodulating the RF signal to extract bit information;

constructing said packetized demodulated bit stream in accordance with a digital packet transport protocol;

prioritizing said packetized demodulated bit stream in accordance with pre-determined policies;

optionally routing said prioritized and packetized demodulated bit stream in accordance with applied policies;

applying said policies to automatically adjust bandwidth utilization parameters and baseband processing capacity based on real-time network conditions.

20. The method according to claim 19, further comprising inserting transit priority coding based on said prioritization.

21. The method according to claim 19, wherein said, policies are created for scheduled and unscheduled localized events and for loss of network resources.

22. The method according to claim 21, wherein said policies are managed by a policy management module configured to receive network status information from a CNO application and responsively issue requests for network changes to the CNO application.

23. The method of claim 16, wherein the plurality of network parameters comprise: a first parameter for monitoring an RF signal after conversion to a digital signal, a second parameter for monitoring an RF front end and/or antenna presence, a third parameter for monitoring all active carriers, a fourth parameter for monitoring active/idle network channels, a fifth parameter for monitoring a network congestion level and a sixth parameter for monitoring event triggered alarms.

24. A wireless communication system comprising:

at least one transport communication medium adapted to generate bidirectional digital information in form of packetized bit streams arranged in accordance with an IP protocol;

a plurality of cells, each cell including a RF antenna in wireless communication with a plurality of mobile devices, a packet transceiver system connected to said transport medium, said packet transceiver system exchanging RF signals with said antenna and exchanging corresponding packetized bit streams with said one transport medium;

a hub coupled to said transport medium, said hub receiving packetized bit streams from said packet transceiver systems, converting said packetized bit stream into converted signals and transmitting said converted signals to other devices for processing; and a traffic consolidator unit including an application sewer configured to support a plurality of customized software applications, including a continuous network optimization (CNO) application for continuously monitoring network performance as represented by a plurality of network parameters related to RF capacity for automatically providing sufficient bandwidth and determining what level of baseband resources are required; determining if an increase/decrease in RF activity has occurred based on said monitored parameters; and automatically adjusting the bandwidth between one of the following sites, Cellsite and hub, Hub to MSQ, hub to hub or MSO to MSO; and a network re-routing application to automate spectrum and network optimization processes based on commands from said CNO.

25. The system of claim 24 wherein said hub includes at least a base station adapted to handle RF signals wherein said hub translates said packetized bit streams into RF signals for said base station.

26. The system of claim 24 wherein said transport communication media is one of a Ethernet copper wire and an Ethernet optical fiber.

27. The system of claim 24 wherein each packet transceiver system includes a signal conditioner for conditioning the packetized bit streams based on Quality of Service rules.

28. The system of claim 24 wherein said transport communication media forms a communication ring connected to each of said packet transceivers, with the packaged data streams traveling through the ring being combined from signals from each of the cells.

* * * * *

UNITED STATES PATENT AND TRADEMARK OFFICE
CERTIFICATE OF CORRECTION

| | | |
|---|---|---|
| PATENT NO. | : 7,573,862 B2 | Page 1 of 1 |
| APPLICATION NO. | : 10/774181 | |
| DATED | : August 11, 2009 | |
| INVENTOR(S) | : Mahdi Chambers et al. | |

It is certified that error appears in the above-identified patent and that said Letters Patent is hereby corrected as shown below:

In the claims:

Col. 12, line 21, claim 24, change "sewer" to -- server --

Col. 12, line 32, claim 24, change "MSQ" to -- MSO --

Signed and Sealed this
Thirty-first Day of May, 2011

David J. Kappos
*Director of the United States Patent and Trademark Office*